US012795684B2

(12) United States Patent
Lo et al.

(10) Patent No.: US 12,795,684 B2
(45) Date of Patent: Nov. 10, 2026

(54) DEVICE AND METHOD FOR HANDLING SEARCH SPACE SET GROUP AND TRANSMISSION CONFIGURATION INDICATOR STATE

(71) Applicant: ACER INCORPORATED, New Taipei City (TW)

(72) Inventors: Li-Chung Lo, New Taipei City (TW); Chien-Min Lee, New Taipei City (TW); Jen-Hsien Chen, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 384 days.

(21) Appl. No.: 18/121,015

(22) Filed: Mar. 14, 2023

(65) Prior Publication Data

US 2023/0337255 A1 Oct. 19, 2023

Related U.S. Application Data

(60) Provisional application No. 63/331,257, filed on Apr. 15, 2022.

(51) Int. Cl.
*H04W 72/232* (2023.01)

(52) U.S. Cl.
CPC ................................ *H04W 72/232* (2023.01)

(58) Field of Classification Search
CPC ... H04W 72/232; H04L 5/0053; H04L 5/0092
See application file for complete search history.

(56) References Cited

U.S. PATENT DOCUMENTS

2020/0045700 A1* 2/2020 Sun ....................... H04L 5/0091
2020/0314880 A1 10/2020 Cirik
(Continued)

FOREIGN PATENT DOCUMENTS

JP 2023-541959 A 10/2023
KR 10-2021-0020827 A 2/2021
(Continued)

OTHER PUBLICATIONS

3GPP TS 38.211 V17.0.0 (Dec. 2021), Technical Specification, 3rd Generation Partnership Project; Technical Specification Group Radio Access Network; NR; Physical channels and modulation, (Release 17), pp. 1-129 ,Dec. 2021.
(Continued)

*Primary Examiner* — Andrew Lee
(74) *Attorney, Agent, or Firm* — Winston Hsu

(57) ABSTRACT

A communication device for monitoring and switching search space set group (SSSG) comprises at least one storage device; and at least one processing circuit, coupled to the at least one storage device, wherein the at least one storage device stores instructions, and the at least one processing circuit is configured to execute the instructions of: receiving a configuration of a first SSSG and a second SSSG from a network, wherein the first SSSG is associated with a transmission configuration indicator (TCI) state and the second SSSG is associated with a plurality of TCI states; monitoring one of the first SSSG and the second SSSG according to the configuration; receiving a first downlink (DL) control information (DCI) for a SSSG switching from the network, when monitoring the one of the first SSSG or the second SSSG according to the configuration; performing the SSSG switching according to the first DCI.

46 Claims, 23 Drawing Sheets

(56) References Cited

U.S. PATENT DOCUMENTS

| | | | | |
|---|---|---|---|---|
| 2020/0351129 | A1 | 11/2020 | Kwak | |
| 2021/0013955 | A1 * | 1/2021 | Takeda | H04W 72/23 |
| 2021/0051635 | A1 | 2/2021 | Lo | |
| 2021/0136802 | A1 | 5/2021 | Cirik | |
| 2021/0321406 | A1 | 10/2021 | Sakhnini | |
| 2021/0360667 | A1 | 11/2021 | Moon | |
| 2022/0038218 | A1 * | 2/2022 | Kim | H04L 1/1854 |
| 2022/0061031 | A1 * | 2/2022 | Park | H04L 5/0094 |
| 2022/0417909 | A1 * | 12/2022 | Zhu | H04L 5/005 |
| 2023/0107880 | A1 * | 4/2023 | Zhu | H04B 7/06964 370/329 |
| 2023/0208598 | A1 * | 6/2023 | Khoshnevisan | H04L 5/0053 370/329 |
| 2023/0254857 | A1 | 8/2023 | Moon | |
| 2023/0328757 | A1 * | 10/2023 | Zhu | H04L 5/0053 |
| 2024/0080843 | A1 * | 3/2024 | Muruganathan | H04W 72/20 |
| 2024/0187075 | A1 * | 6/2024 | Kuang | H04B 7/0695 |
| 2024/0205695 | A1 * | 6/2024 | Muruganathan | H04L 5/0069 |
| 2024/0389109 | A1 * | 11/2024 | Lee | H04W 52/0216 |
| 2025/0071778 | A1 * | 2/2025 | Yuan | H04W 72/231 |
| 2025/0113365 | A1 * | 4/2025 | Lee | H04L 5/0053 |

FOREIGN PATENT DOCUMENTS

| | | | |
|---|---|---|---|
| KR | 10-2022-0007514 | A | 1/2022 |
| TW | 202147903 | A | 12/2021 |
| WO | 2021/090506 | | 5/2021 |
| WO | 2021/157035 | A1 | 8/2021 |
| WO | 2021/206990 | | 10/2021 |
| WO | 2021/227917 | A1 | 11/2021 |
| WO | 2022/012440 | A1 | 1/2022 |
| WO | 2022/031515 | A1 | 2/2022 |
| WO | 2022/031546 | A1 | 2/2022 |
| WO | 2022/066929 | A1 | 3/2022 |
| WO | 2022/071688 | A1 | 4/2022 |
| WO | 2022/144837 | A1 | 7/2022 |

OTHER PUBLICATIONS

Spreadtrum Communications, Remaining issues on multi-beam enhancements, 3GPP TSG RAN WG1 #108-e, R1-2201534, e-Meeting, Feb. 21-Mar. 3, 2022, XP052109566, Feb. 21, 2022.

Moderator (Samsung), Moderator Summary for Maintenance on Rel-17 Multi-Beam, 3GPP TSG RAN WG1 #108-e, R1-2201994, e-Meeting, Feb. 21-Mar. 3, 2022, XP052122376, Feb. 21, 2022.

* cited by examiner

202

| TCI Codepoint | 1st TCI state | 2nd TCI state |
|---|---|---|
| 0 | TCI state $ID_{0,1}$ | N/A |
| 1 | TCI state $ID_{1,1}$ | N/A |
| 2 | TCI state $ID_{2,1}$ (Default TCI state) | TCI state $ID_{2,2}$ |
| 3 | TCI state $ID_{3,1}$ | TCI state $ID_{3,2}$ (Default TCI state) |

204

| | |
|---|---|
| $C_0$='0' | TCI state $ID_{0,1}$ |
| R | N/A |
| $C_1$='0' | TCI state $ID_{1,1}$ |
| R | N/A |
| $C_2$='1' | TCI state $ID_{2,1}$ (Default TCI state) |
| $D_2$='0' | TCI state $ID_{2,2}$ |
| $C_3$='1' | TCI state $ID_{3,1}$ |
| $D_3$='1' | TCI state $ID_{3,2}$ (Default TCI state) |

FIG. 20

212

| TCI Codepoint | 1st TCI state | 2nd TCI state |
|---|---|---|
| 0 | TCI state $ID_{0,1}$ | N/A |
| 1 | TCI state $ID_{1,1}$ | N/A |
| 2 | TCI state $ID_{2,1}$ | TCI state $ID_{2,2}$ (Default TCI state) |
| 3 | TCI state $ID_{3,1}$ | TCI state $ID_{3,2}$ (Default TCI state) |

FIG. 21

DEVICE AND METHOD FOR HANDLING SEARCH SPACE SET GROUP AND TRANSMISSION CONFIGURATION INDICATOR STATE

CROSS REFERENCE TO RELATED APPLICATIONS

This application claims the benefit of U.S. Provisional Application No. 63/331,257, filed on Apr. 15, 2022. The content of the application is incorporated herein by reference.

BACKGROUND OF THE INVENTION

1. Field of the Invention

The present invention relates to a device and a method used in a wireless communication system, and more particularly, to a device and a method of handling search space set group (SSSG) and transmission configuration indicator (TCI) state.

2. Description of the Prior Art

A long-term evolution (LTE) system supporting the 3rd Generation Partnership Project (3GPP) Rel-8 standard and/or the 3GPP Rel-9 standard is developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage.

An LTE-advanced (LTE-A) system, as its name implies, is an evolution of the LTE system. The LTE-A system targets faster switching between power states, improves performance at the coverage edge of an evolved Node-B (eNB), increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc.

A next generation radio access network (NG-RAN) is developed for further enhancing the LTE-A system. The NG-RAN includes one or more next generation Node-Bs (gNBs), and has properties of wider operation bands, different numerologies for different frequency ranges, massive MIMO, advanced channel codings, etc. The NG-RAN supports massive connectivity, high capacity, ultra-reliability and low latency. Such diverse scenarios require disrupting approaches for the realization of a NR system. A multi-transmission reception point (TRP) is vital in the NR system in order to improve reliability, coverage, and capacity performance through flexible deployment scenarios.

In the NR system, a dynamic switching between a single-TRP and the multi-TRP is needed for a high mobility user equipment (UE). However, the single-TRP and the multi-TRP configured by a radio resource control (RRC) and/or a media access control (MAC) control element (CE) cannot switch dynamically. A search space set group (SSSG) monitoring and a transmission configuration indicator (TCI) state(s) are expected to realize the dynamic switching between the single-TRP and the multi-TRP. Thus, how to handling SSSG and ICI state is an important problem to be solved.

SUMMARY OF THE INVENTION

The present invention therefore provides a communication device and method for handling search space set group (SSSG) and transmission configuration indicator (TCI) state to solve the abovementioned problem.

A communication device for monitoring and switching search space set group (SSSG) comprises at least one storage device; and at least one processing circuit, coupled to the at least one storage device, wherein the at least one storage device stores instructions, and the at least one processing circuit is configured to execute the instructions of: receiving a configuration of a first SSSG and a second SSSG from a network, wherein the first SSSG is associated with a transmission configuration indicator (TCI) state and the second SSSG is associated with a plurality of TCI states; monitoring one of the first SSSG and the second SSSG according to the configuration; receiving a first downlink (DL) control information (DCI) for a SSSG switching from the network, when monitoring the one of the first SSSG or the second SSSG according to the configuration; performing the SSSG switching according to the first DCI.

A network for monitoring and switching search space set group (SSSG) comprises at least one storage device; and at least one processing circuit, coupled to the at least one storage device, wherein the at least one storage device stores instructions, and the at least one processing circuit is configured to execute the instructions of: generating a configuration of a first SSSG and a second SSSG, wherein the first SSSG is associated with a transmission configuration indicator (TCI) state and the second SSSG is associated with a plurality of TCI states; transmitting the configuration to a communication device; generating a first downlink (DL) control information (DCI) for a SSSG switching; and transmitting the first DCI to the communication device.

A communication device for indicating and applying transmission configuration indicator (TCI) state comprises at least one storage device; and at least one processing circuit, coupled to the at least one storage device, wherein the at least one storage device stores instructions, and the at least one processing circuit is configured to execute the instructions of: receiving a downlink (DL) control information (DCI) from a network via a control resource set (CORESET); wherein the DCI comprises a TCI field, and the TCI field indicates a TCI codepoint corresponding to at least one of a first TCI state or a second TCI state.

A network for indicating and applying transmission configuration indicator (TCI) state comprises at least one storage device; and at least one processing circuit, coupled to the at least one storage device, wherein the at least one storage device stores instructions, and the at least one processing circuit is configured to execute the instructions of: generating a downlink (DL) control information (DCI); transmitting the DCI to a communication device via a control resource set (CORESET); wherein the DCI comprises a TCI field, and the TCI field indicates a TCI codepoint corresponding to at least one of a first TCI state or a second TCI state.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 20 is a schematic diagram of TCI codepoints of a TCI field in a DCI according to an example of the present invention.

FIG. 21 is a schematic diagram of TCI codepoints of a TCI field in a DCI according to an example of the present invention.

DETAILED DESCRIPTION

Figure 1:
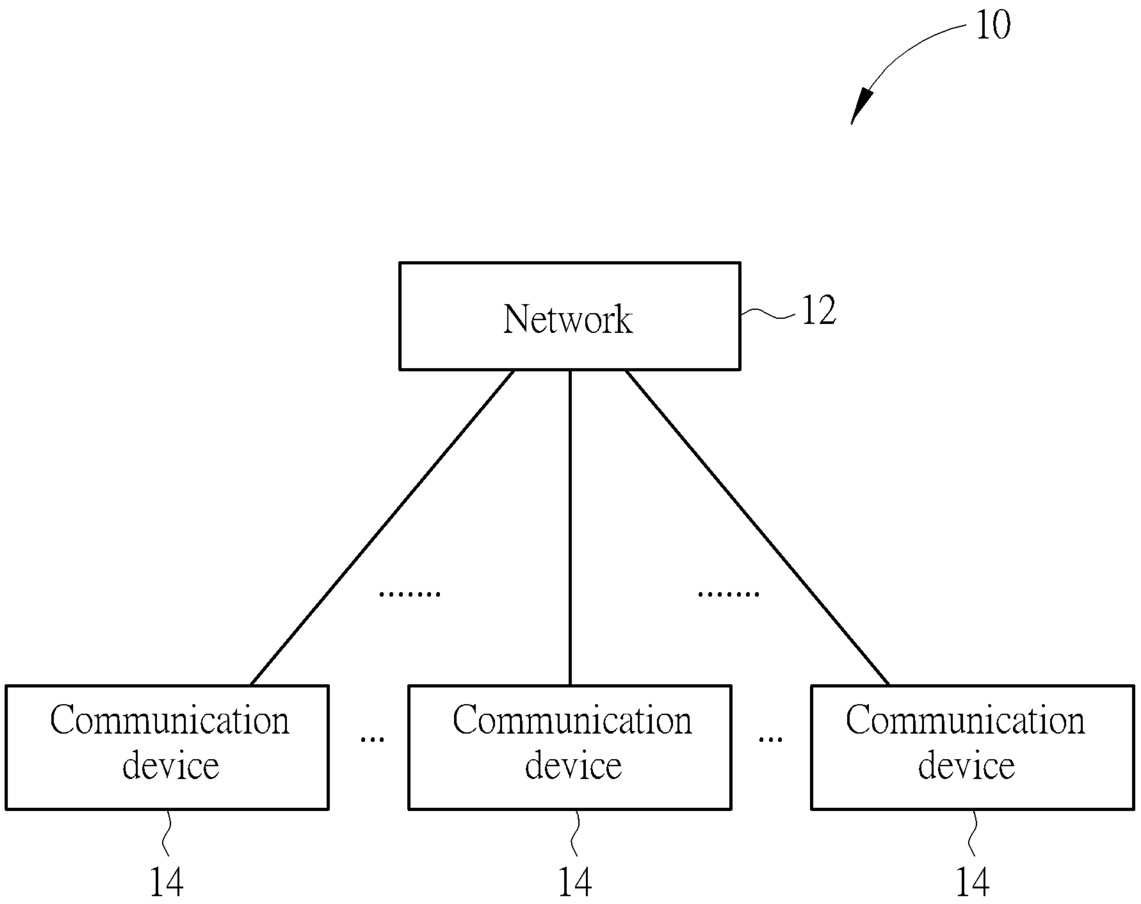
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network 12 and a plurality of communication devices 14. The wireless communication system 10 may support a time-division duplexing (TDD) mode, a frequency-division duplexing (FDD) mode, a TDD-FDD joint operation mode, a non-terrestrial network (NTN) mode or a licensed-assisted access (LAA) mode. That is, the network 12 and a communication device 14 may communicate with each other via FDD carrier(s), TDD carrier(s), licensed carrier(s) (licensed serving cell (s)) and/or unlicensed carrier (s) (unlicensed serving cell(s)). In addition, the wireless communication system 10 may support a carrier aggregation (CA). That is, the network 12 and a communication device 14 may communicate with each other via multiple serving cells (e.g., multiple serving carriers) including a primary cell (e.g., primary component carrier) and one or more secondary cells (e.g., secondary component carriers).

In FIG. 1, the network 12 and the communication devices 14 are simply utilized for illustrating the structure of the wireless communication system 10. Practically, the network 12 may be a universal terrestrial radio access network (UTRAN) including at least one Node-B (NB) in a universal mobile telecommunications system (UMTS). In one example, the network 12 may be an evolved UTRAN (E-UTRAN) including at least one evolved NB (eNB) and/or at least one relay node in a long term evolution (LTE) system, an LTE-Advanced (LTE-A) system, an evolution of the LTE-A system, etc. In one example, the network 12 may be a next generation radio access network (NG-RAN) including at least one next generation Node-B (gNB) and/or at least one fifth generation (5G) base station (BS). In one example, the gNB or the 5G BS of network 12 may include a NTN Gateway and a NTN payload. In one example, the network 12 may be any BS conforming to a specific communication standard to communicate with a communication device 14.

A new radio (NR) is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher reliability and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network 12 may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), Access and Mobility Management Function (AMF), Session Management Function (SMF), User Plane Function (UPF), Authentication Server Function (AUSF), etc. In one example, after the network 12 receives information transmitted by a communication device 14, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

In addition, the network 12 may also include a service provider and at least one base transceiver station (BTS). The service provider may be an organization that provides services (e.g., consulting, legal, real estate, communications, storage, and processing services). The at least one BTS may be at least one NB, at least one eNB, at least one gNB and/or at least one 5G BS. The service provider may transmit service data to the BTS, and the BTS may forward the service data to a communication device 14. In one example, the service data may be service information such as Internet security, ringtone music, e-reading, daily life applications, bill collection, etc. In one example, the service data may be video and/or audio data (e.g., with a format h.265, h.266, or AV1 or conforming to Moving Picture Experts Group 4 (MPEG-4)). In one example, the service data may be data for an augmented reality (AR), a virtual reality (VR), a mixed reality (MR) and/or an extended reality (XR). The service provider may generate corresponding data according to data associated to a communication device 14 (e.g., a geographic location of the communication device 14, Bluetooth information for the communication device 14, information of the communication device 14 stored by the service provider).

A communication device 14 may be a user equipment (UE), a Very Small Aperture Terminal (VSAT), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network 12 and the communication device 14 can be seen as a transmitter or a receiver according to direction (i.e., transmission direction), e.g., for an uplink (UL), the communication device 14 is the transmitter and the network 12 is the receiver, and for a downlink (DL), the network 12 is the transmitter and the communication device 14 is the receiver.

Figure 2:
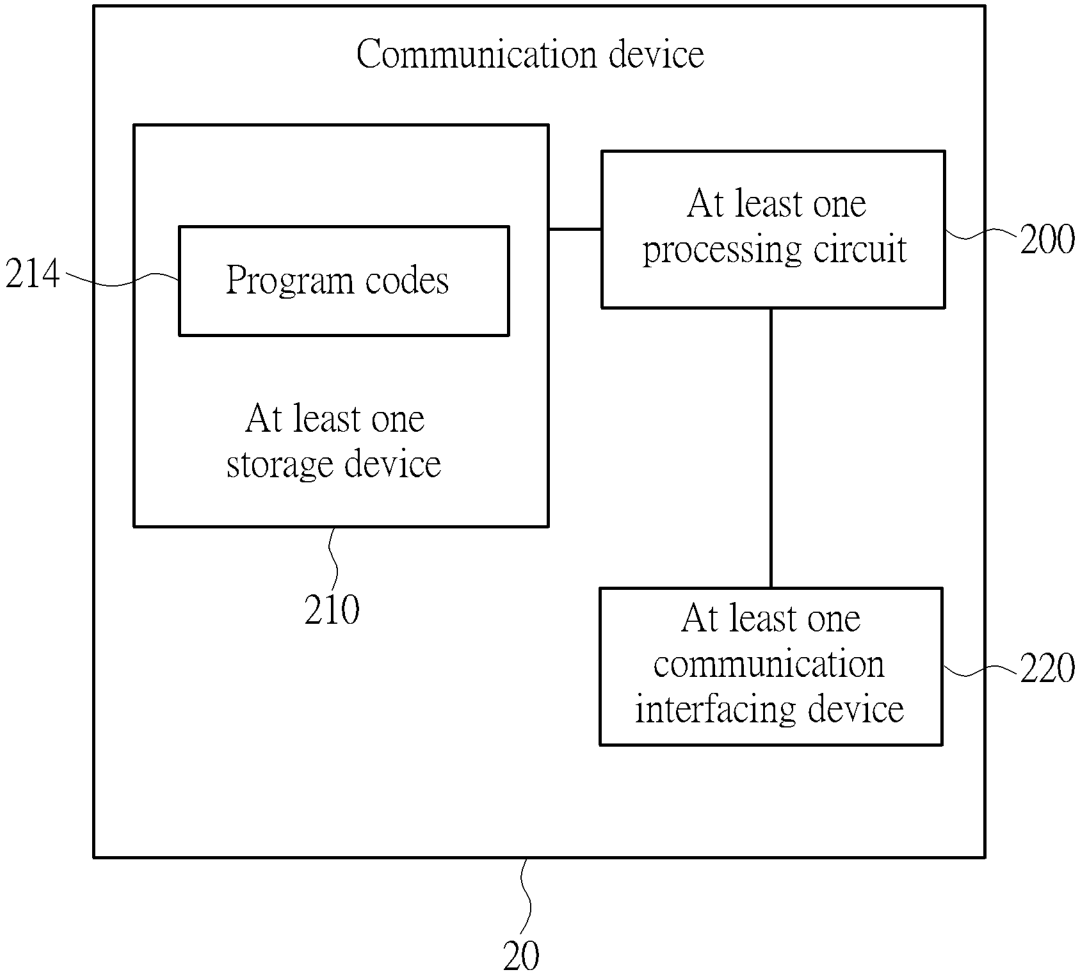
FIG. 2 is a schematic diagram of a communication device according to an example of the present invention.

FIG. 2 is a schematic diagram of a communication device 20 according to an example of the present invention. The communication device 20 may be a communication device 14 or the network 12 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include, but are not limited to, a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
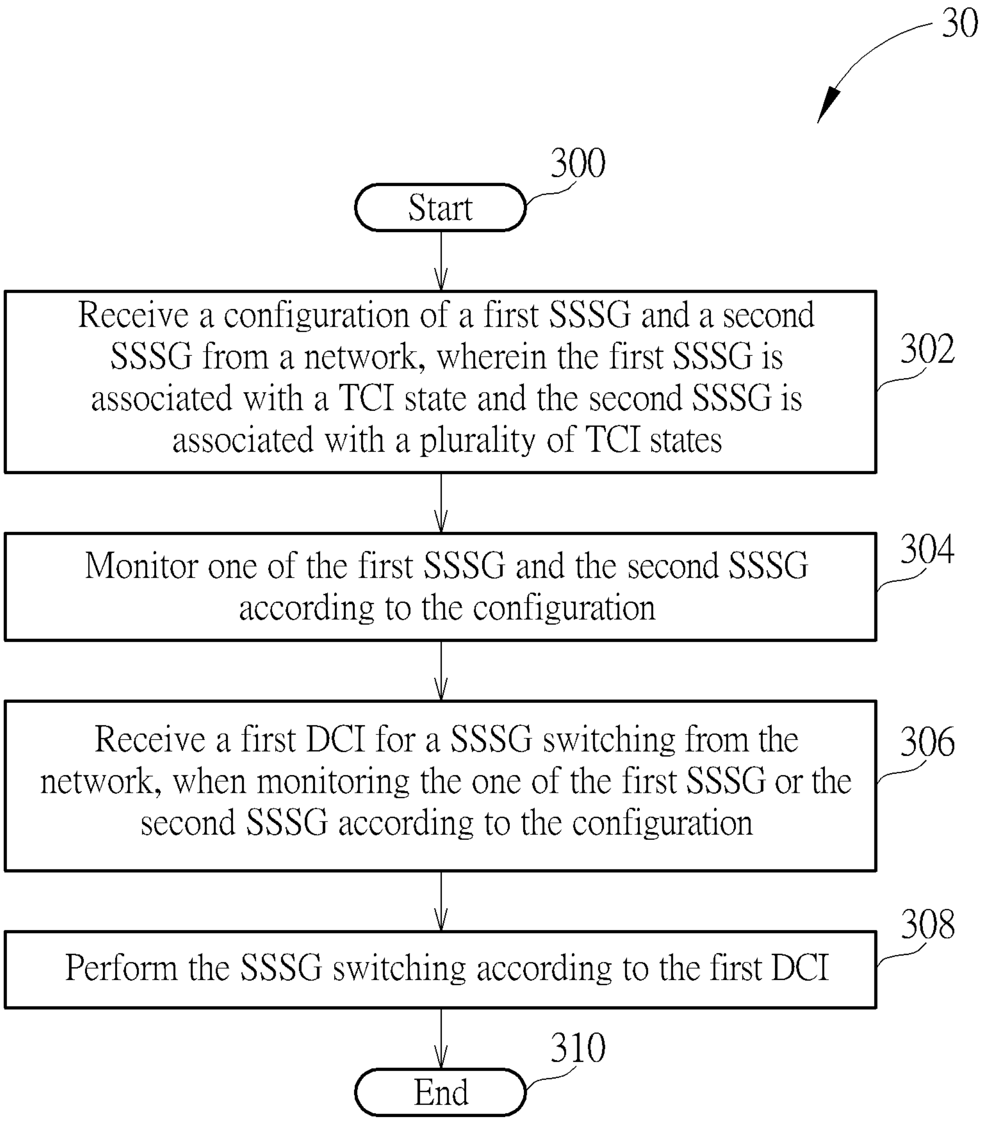
FIG. 3 is a flowchart of a process according to an example of the present invention.

FIG. 3 is a flowchart of a process 30 according to an example of the present invention. The process 30 may be utilized in a communication device (e.g., a communication device 14 in FIG. 1 or the communication device 20 in FIG. 2), to monitor and switch search space set group (SSSG). The process 30 may be compiled into the program codes 214 and includes the following steps:

Step 300: Start.

Step 302: Receive a configuration of a first SSSG and a second SSSG from a network, wherein the first SSSG is associated with a transmission configuration indicator (TCI) state and the second SSSG is associated with a plurality of TCI states.

Step 304: Monitor one of the first SSSG and the second SSSG according to the configuration.

Step 306: Receive a first DL control information (DCI) for a SSSG switching from the network, when monitoring the one of the first SSSG or the second SSSG according to the configuration.

Step 308: Perform the SSSG switching according to the first DCI.

Step 310: End.

According to the process 30, the communication device receives a configuration of a first SSSG and a second SSSG from a network, wherein the first SSSG is associated with a TCI state and the second SSSG is associated with a plurality of TCI states. The communication device is configured with the first SSSG and the second SSSG. Then, the communication device monitors one of the first SSSG and the second SSSG according to the configuration, and receives a first DCI for a SSSG switching from the network when monitoring the one of the first SSSG or the second SSSG according to the configuration. The communication device performs the SSSG switching according to the first DCI. That is, the SSSG switching is performed according to the configuration and the DCI received from the network. Thus, the dynamic switching between the single-TRP and the multi-TRP can be realized according to the SSSG switching.

Realization of the process 30 is not limited to the above description. The following examples may be applied to realize the process 30.

In one example, the first SSSG is associated with at least one control resource set (CORESET), and each of the at least one CORESET is associated (e.g., activated or indicated) with one TCI state. In one example, the second SSSG is associated with a CORESET, and the CORESET is associated (e.g., activated or indicated) with the plurality of TCI states. In one example, the second SSSG is associated with a plurality of CORESETs, and the CORESETs are associated (e.g., activated or indicated) with the plurality of TCI states, respectively.

In one example, the first DCI comprises a field. Further, the step 308 comprises that communication device switches to the first SSSG and monitors the first SSSG according to the TCI state, when the field indicates the TCI state. The step 308 further comprises that communication device switches to the second SSSG and monitors the second SSSG according to the plurality of TCI state, when the field indicates the plurality of TCI state.

In one example, the first DCI comprises a first field and a second field. Further, the step 308 comprises that communication device switches to the first SSSG and monitors the first SSSG according to the TCI state, when the first field indicates the TCI state and the second field indicates the first SSSG. The step 308 further comprises that communication device switches to the second SSSG and monitors the second SSSG according to the plurality of TCI state, when the first field indicates the plurality of TCI state and the second field indicates the second SSSG.

In one example, the first DCI comprises a first field and a second field. Further, the step 308 comprises that communication device switches to the second SSSG and monitors the second SSSG according to the TCI state, when the first field indicates the TCI state and the second field indicates the second SSSG. In detail, the communication device monitors a first subgroup of the second SSSG and a second subgroup of the second SSSG according to the TCI state. In one example, at least one first search space (SS) set in the first subgroup corresponds to at least one second SS set in the second subgroup, respectively. In one example, a first CORESET associated with the first subgroup and a second CORESET associated with the second subgroup are associated with a same TCI state.

In one example, the communication device transmits information to the network. The information may comprise a moving direction, a speed and/or a location of the communication device. In one example, the first DCI comprises first DCI comprises a first field and a second field indicating a time period. Further, the step 308 comprises that communication device switches to the first SSSG at an end of the time period and monitors the first SSSG according to the TCI state, when the first field indicates the TCI state. The step 308 further comprises that communication device switches to the second SSSG at the end of the time period and monitors the second SSSG according to the plurality of TCI state, when the first field indicates the plurality of ICI state. In one example, the time period is between a first time instant of receiving the first DCI from the network and a second time instant of performing the SSSG switching. In one example, the time period is between a first time instant of transmitting a Hybrid Automatic Repeat Request (HARQ) feedback corresponding to the first DCI and a second time instant of performing the SSSG switching.

In one example, the first DCI comprises a field indicating a time period. Further, the step 308 comprises that communication device switches to the first SSSG at an end of the time period and monitors the first SSSG according to the TCI state, when monitoring the second SSSG. The step 308 further comprises that communication device switches to the second SSSG at the end of the time period and monitors the second SSSG according to the plurality of TCI state, when monitoring the first SSSG.

In one example, the step 308 comprises that communication device starts a timer, when receiving the first DCI from the network and monitoring the second SSSG associated with the plurality of TCI state. The step 308 further comprises that communication device switches to a default SSSG and monitors the default SSSG according to one of the plurality of TCI state, when the timer expires. The step 308 further comprises that communication device restarts the timer, when receiving a second DCI from the network and monitoring the second SSSG associated with the plurality of TCI state. In one example, the default SSSG is predetermined (e.g., a SSSG with a lowest index) or indicated by the network.

In one example, the first DCI comprises a first field indicating the plurality of TCI state and a second field indicating a time period. Further, the step 308 comprises that communication device monitors the first SSSG according to one of the plurality of TCI state (e.g., a default TCI state). The step 308 further comprises that communication device switches to the second SSSG at an end of the time period and monitoring the second SSSG according to the plurality of TCI state. In one example, the one of the plurality of TCI state is predetermined (e.g., by the network) or indicated by a media access control (MAC) control element (CE).

In one example, the first DCI comprises a first field indicating one of the plurality of TCI state and a second field indicating a first time period. Further, the step 308 comprises that communication device monitors the first SSSG according to the one of the plurality of TCI state. The step 308 further comprises that communication device receives a second DCI. The second DCI comprises a third field indicating the plurality of TCI state and a fourth field indicating a second time period. The step 308 further comprises that communication device switches to the second SSSG at the end of the second time period and monitors the second SSSG according to the plurality of TCI state. In one example, an end of the first time period and the end of the second time period are at a same time instant.

In one example, the first DCI comprises a first field and a second field. Further, the step 308 comprises that communication device switches to the first SSSG and monitors the first SSSG according to the TCI state, when the first field indicates the TCI state and the second field indicates that a first SSSG monitoring associated with a first value of a CORESET pool index is disabled. The step 308 further comprises that communication device switches to the second SSSG and monitors the second SSSG according to the plurality of TCI state, when the first field indicates the plurality of TCI state and the second field indicates that a second SSSG monitoring associated with a second value of the CORESET pool index is enabled. In one example, the first DCI is associated with one of the first CORESET pool index and the second CORESET pool index. In one example, the communication device receives the first DCI from the network (e.g., a transmission reception point (TRP) of the network) indicated by the one of the first CORESET pool index and the second CORESET pool index.

In one example, the first DCI comprises a field indicating the TCI state. Further, the step 308 comprises that communication device switches to the first SSSG and monitors the first SSSG according to the TCI state, when the field indicates the TCI state. In one example, the first DCI is associated with a CORESET pool index. In one example, the communication device receives the DCI from the network (e.g., a TRP of the network) indicated by the CORESET pool index. In one example, the (first) field indicating the TCI state or the plurality of TCI state is a TCI field with a TCI codepoint.

Figure 4:
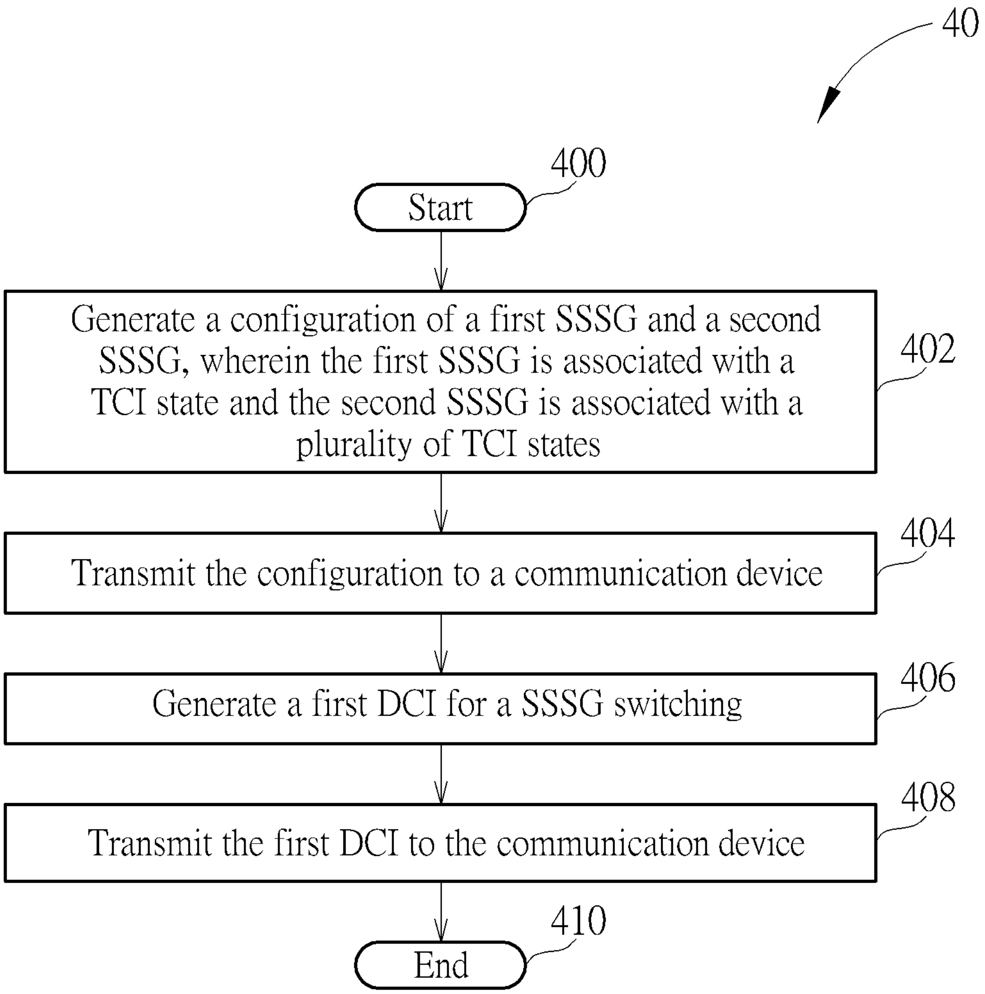
FIG. 4 is a flowchart of a process according to an example of the present invention.

FIG. 4 is a flowchart of a process 40 according to an example of the present invention. The process 40 may be utilized in a network (e.g., the network 12 in FIG. 1 or the communication device 20 in FIG. 2), to monitor and switch SSSG. The process 40 may be compiled into the program codes 214 and includes the following steps:

Step 400: Start.

Step 402: Generate a configuration of a first SSSG and a second SSSG, wherein the first SSSG is associated with a TCI state and the second SSSG is associated with a plurality of TCI states.

Step 404: Transmit the configuration to a communication device.

Step 406: Generate a first DCI for a SSSG switching.

Step 408: Transmit the first DCI to the communication device.

Step 410: End.

According to the process 40, the network generates a configuration of a first SSSG and a second SSSG, and transits the configuration to a communication device. The first SSSG is associated with a TCI state, and the second SSSG is associated with a plurality of TCI states. Then, the network generates a first DCI for a SSSG switching, and transmits the first DCI to the communication device. That is, the communication device may perform a SSSG switching according to the configuration and the DCI received from the network. Thus, the dynamic switching between the single-TRP and the multi-TRP can be realized according to the SSSG switching.

Realization of the process 40 is not limited to the above description. The following examples may be applied to realize the process 40.

In one example, the first DCI comprises a first field indicating the TCI state or the plurality of TCI state. In one example, the first DCI further comprises a second field indicating a time period. In one example, the time period is between a first time instant for the communication device to receive the first DCI from the network and a second time instant for the communication device to perform the SSSG switching. In one example, the time period is between a first time instant for the communication device to transmit a HARQ feedback corresponding to the first DCI and a second time instant for the communication device to perform the SSSG switching. Alternative, the first DCI further comprises a second field indicating that a first SSSG monitoring associated with a first CORESET pool index is disabled or indicating that a second SSSG monitoring associated with a second CORESET pool index is enabled. In one example, the first DCI is associated with one of the first CORESET pool index and the second CORESET pool index. In one example, the first DCI is transmitted to the communication device from the network indicated by the one of the first CORESET pool index and the second CORESET pool index. Alternative, the first DCI further comprises a second field indicating the first SSSG or the second SSSG.

In one example, the first DCI comprises a field indicating a time period. In one example, the network generates a second DCI for the SSSG switching, and transmits the second DCI to the communication device. In one example, the first DCI comprises a first field indicating one of the plurality of TCI state and a second field indicating a first time period, and the second DCI comprises a third field indicating the plurality of TCI state and a fourth field indicating a second time period. In one example, an end of the first time period and the end of the second time period are at a same time instant.

The examples of the process 30 may be applied to the process 40, and are not narrated herein for brevity.

Figure 5:
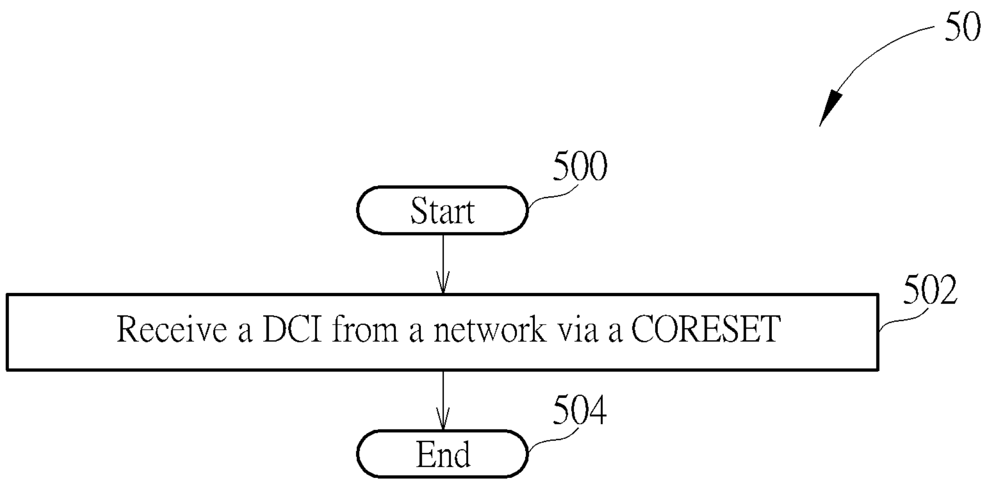
FIG. 5 is a flowchart of a process according to an example of the present invention.

FIG. 5 is a flowchart of a process 50 according to an example of the present invention. The process 50 may be utilized in a communication device (e.g., a communication device 14 in FIG. 1 or the communication device 20 in FIG. 2), to indicate and apply TCI state. The process 50 may be compiled into the program codes 214 and includes the following steps:

Step 500: Start.

Step 502: Receive a DCI from a network via a CORESET.

Step 504: End.

According to the process 50, the communication device receives a DCI from a network via a CORESET. The DCI comprises a TCI field, and the TCI field indicates a TCI codepoint corresponding to at least one of a first TCI state or a second TCI state. Thus, the dynamic switching between the single-TRP and the multi-TRP can be realized according to the at least one of the first TCI state or the second TCI state.

Realization of the process 50 is not limited to the above description. The following examples may be applied to realize the process 50.

In one example, the first TCI state TCI is a DL TCI state or an UL TCI state, and the second TCI state is the DL TCI state or the UL TCI state. In one example, the CORESET is configured with at least one TCI state indicated by the DCI, and the at least one TCI state comprise the at least one of the first TCI state or the second TCI state. In one example, the communication device receives at least one physical DL control channel (PDCCH) from the network according to the at least one TCI state via the CORESET. A demodulation reference signal (DM-RS) antenna port for receiving the at least one PDCCH via the CORESET is quasi co-located (QCLed) with a plurality of RSs provided by the at least one TCI State.

In one example, the CORESET is associated with at least one of a plurality of UE specific search space (USS) sets or a plurality of PDCCH common search space (CSS) sets. The plurality of PDCCH sets CSS may be Type3-PDCCH CSS sets, but are not limited herein. In one example, the CORESET is configured with a value of a CORESET pool index, and the value of the CORESET pool index is associated with the at least one of a first TCI state or a second TCI state. In one example, the CORESET is comprised in a SSSG. In one example, the TCI field indicates the at least one of the first TCI state or the second TCI state in a component carrier (CC) set or a bandwidth part (BWP) set in a CC list. In one example, the communication device receives an activation command for mapping a plurality of TCI states to at least one TCI codepoint of the TCI field, from the network.

In one example, the communication device transmits a physical UL control channel (PUCCH) to the network according to a spatial setting associated with at least one TCI state, wherein the at least one TCI state comprises the at least one of the first TCI state or the second TCI state. In one example, the TCI codepoint is associated with a value of a CORESET pool index. In one example, the first TCI state and the second TCI are associated with a same value of a CORESET pool index, if the TCI codepoint is corresponding to the first TCI state and the second TCI. In one example, the communication device transmits a PUCCH corresponding to the DCI comprising a TCI state indication to the network, wherein a last symbol of the PUCCH comprises HARQ feedback. In one example, the communication device starts applying the at least one of the first TCI state or the second TCI state indicated by the TCI field from a slot that is at least time for beam application symbols after the last symbol of the PUCCH, if the at least one of the first TCI state or the second TCI state is different from a previous TCI state indicated by a previous TCI state indication.

The examples of the processes 30-40 may be applied to the process 50, and are not narrated herein for brevity.

Figure 6:
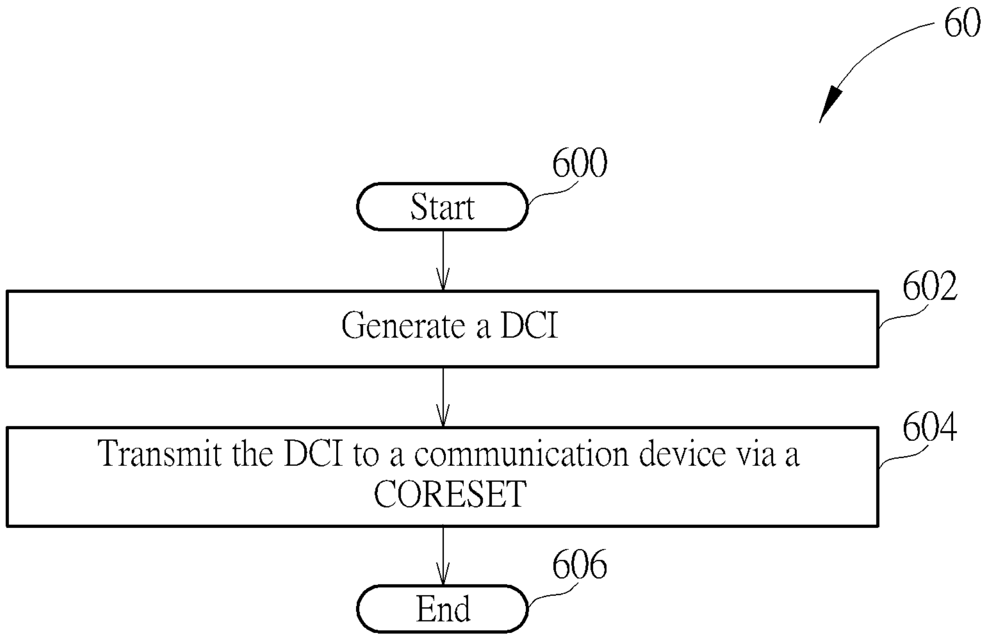
FIG. 6 is a flowchart of a process according to an example of the present invention.

FIG. 6 is a flowchart of a process 60 according to an example of the present invention. The process 60 may be utilized in a network (e.g., the network 12 in FIG. 1 or the communication device 20 in FIG. 2), to indicate and apply TCI state. The process 60 may be compiled into the program codes 214 and includes the following steps:

Step 600: Start.

Step 602: Generate a DCI.

Step 604: Transmit the DCI to a communication device via a CORESET.

Step 606: End.

According to the process 60, the network generates a DCI, and transmits the DCI to a communication device via a CORESET. The DCI comprises a TCI field, and the TCI field indicates a TCI codepoint corresponding to at least one of a first TCI state or a second TCI state. That is, the communication device receives the DCI indicating the at least one of the first TCI state or the second TCI state. Thus, the dynamic switching between the single-TRP and the multi-TRP can be realized according to the at least one of the first TCI state or the second TCI state.

Realization of the process 50 is not limited to the above description. The following examples may be applied to realize the process 50.

In one example, the first TCI state TCI is a DL TCI state or an UL TCI state, and the second TCI state is the DL TCI state or the UL TCI state. In one example, the CORESET is configured with at least one TCI state indicated by the DCI, and the at least one TCI state comprise the at least one of the first TCI state or the second TCI state. In one example, the network transits at least one PDCCH to the communication device according to the at least one TCI state via the CORESET. A DM-RS antenna port for receiving the at least one PDCCH via the CORESET is QCLed with a plurality of RSs provided by the at least one TCI State.

In one example, the CORESET is associated with at least one of a plurality of USS sets or a plurality of PDCCH CSS sets. The plurality of PDCCH sets CSS may be Type3-PDCCH CSS sets, but are not limited herein. In one example, the CORESET is configured with a value of a CORESET pool index, and the value of the CORESET pool index is associated with the at least one of a first TCI state or a second TCI state. In one example, the CORESET is comprised in a SSSG. In one example, the TCI field indicates the at least one of the first TCI state or the second TCI state in a CC set or a BWP set in a CC list. In one example, the network transmits an activation command for mapping a plurality of TCI states to at least one TCI codepoint of the TCI field, to the communication device.

In one example, the network receives a PUCCH from the communication device according to a spatial setting associated with at least one TCI state, wherein the at least one TCI state comprises the at least one of the first TCI state or the second TCI state. In one example, the TCI codepoint is associated with a value of a CORESET pool index. In one example, the first TCI state and the second TCI are associated with a same value of a CORESET pool index, if the TCI codepoint is corresponding to the first TCI state and the second TCI. In one example, the network receives a PUCCH corresponding to the DCI comprising a TCI state indication from the communication device, wherein a last symbol of the PUCCH comprises HARQ feedback. In one example, the at least one of the first TCI state or the second TCI state indicated by the TCI state indication starts to be applied from a slot that is at least time for beam application symbols after the last symbol of the PUCCH, if the at least one of the first TCI state or the second TCI state is different from a previous TCI state indicated by a previous TCI state indication.

The examples of the processes 30-50 may be applied to the process 60, and are not narrated herein for brevity.

The following examples may be applied to the processes 30-60.

In one example, a DCI (e.g., the first/second DCI in the processes 30-40 or the DCI in the processes 50-60) is associated with at least one SS set, the at least one SS set is associated with at least one CORESET, and the at least one CORESET is associated (e.g., activated) with at least one TCI state. For example, the DCI is associated with a SS set, the SS set is associated with a CORESET, and the CORESET is activated with a TCI state. For example, the DCI is associated with a plurality of SS sets, the plurality of SS sets are associated with a plurality of CORESETs, respectively, and the plurality of CORESETs are activated with a plurality of TCI states, respectively. The plurality of SS sets correspond to each other. For example, the DCI is associated with a SS set, the SS set is associated with a CORESET, and the CORESET is activated with a plurality of TCI state.

In one example, a CORESET is configured with a value of a CORESET pool index. In one example, the DCI comprises a DL assignment. In one example, the DCI does not comprise the DL assignment. If the DCI does not comprise the DL assignment, the communication device determines that a radio network temporary udentifier (RNTI) (e.g., CS-RNTI) is used for scrambling a cyclic redundancy check (CRC) for the DCI, and determines a redundancy version (RV) parameter with “1”, a modulation coding scheme (MCS) parameter with “1”, a new data indicator (NDI) with “0”, a frequency domain resource allocation (FDRA) Type 0 parameter with “0”, a FDRA Type 1 parameter with “1” and a dynamic switch parameter with “0”.

In one example, the communication device is configured with a TCI state configuration list by a radio resource control (RRC). In one example, the communication device performs a PUSCH transmission with a configured grant, when the communication device is configured with at least one TCI state for the UL. The configured grant may be a Type 1 configured grant, a Type 2 configured grant or a dynamic grant.

In one example, the communication device transmits (e.g., reports) at least one capability to the network. The at least one capability may indicate whether the communication device supports at least one following information: a SSSG switching determined by the DCI; a timer for switching to a default SSSG; a default TCI state indicated by a MAC CE for monitoring the default SSSG; a predetermined default TCI state for monitoring the default SSSG; an indicator in a DCI to indicate a time period for the SSSG switching; a TCI state for a SSSG switching/monitoring configured by a RRC; a TCI state for the SSSG switching/monitoring indicated by the DCI; enabling/disabling the SSSG switching associated with a value of a CORESET pool index; and a channel/RS grouping by the DCI.

In one example, the TCI codepoint of the TCI field in the DCI indicates two TCI states (e.g., the plurality of TCI states in the processes 30-40, or the first TCI state and the second TCI state in the processes 50-60). The two TCI states are associated with two groups of channels/RSs, respectively. The communication device applies the two TCI states in response to the TCI codepoint. In one example, the TCI codepoint of the TCI field in the DCI indicates one TCI state (e.g., the TCI state in the processes 30-40, or the first TCI state or the second TCI state in the processes 50-60). The one TCI state is associated with the two groups of channels/RSs, or is associated with one of the two groups of channels/RSs. The communication device applies the one TCI states in response to the TCI codepoint. In one example, the DCI comprises at least one TCI field. The at least one TCI field comprises at least one TCI codepoint associated with at least one group of channels/RSs, respectively.

In one example, a group of channels/RSs comprises at least one following information: (a value of) a CORESET pool index; (an index of) a SS set; (an index of) a CORESET; (an index of) a code division multiplexing (CDM)

group of a PDSCH; (an index of) an antenna port of a DM-RS of a PDSCH; (an index of) a semi persistent scheduling (SPS) configuration; (an index of) a CSI-RS resource; (an index of) a CSI-RS group; (an index of) a PUCCH resource group; (an index of) a PUCCH resource; (an index of) a CDM group of a PUSCH; (an index of) an antenna port of a DM-RS of a PUSCH; (an index of) a grant configuration; (an index of) a sound reference signal (SRS) resource; and (an index of) a SRS group.

In one example, the TCI codepoint of the TCI field in the DCI comprise at least one bit, and indicates at least one TCI state. The at least one bit is associated with at least one group of channels/RSs, respectively. For example, a TCI codepoint comprise four bits "0101" associated with four groups of channels/RSs, respectively. The communication device applies a first TCI state for the 1st group of channels/RSs in response to the 1st bit with "0", applies a second TCI state for the 2nd group of channels/RSs in response to the 2nd bit with "1", applies the first TCI state for the 3rd group of channels/RSs in response to the 3rd bit with "0", and applies the second TCI state for the 4th group of channels/RSs in response to the 4th bit with "1".

In one example, a number of the at least one bits comprised in the TCI codepoint is determined according to at least one following information: a number of at least one CORESET pool index; a number of at least one SS set; a number of at least one CORESET; a number of at least one CDM group of a PDSCH; a number of at least one antenna port of a DM-RS of a PDSCH; a number of at least one SPS configuration; a number of at least one PUCCH resource group (each of the at least one PUCCH resource group comprises at least one PUCCH resource); a number of at least one PUCCH resource; a number of at least one CDM group of a PUSCH; a number of at least one antenna port of a DM-RS of a PUSCH; a number of at least one grant configuration; a number of at least one CSI-RS resource; a number of at least one CSI-RS group; a number of at least one SRS resource; and a number of at least one SRS group.

In one example, the DCI comprises a TCI field with a TCI codepoint and a grouping field with a grouping codepoint. The TCI codepoint indicates at least one TCI state of a plurality of TCI states, and the grouping codepoint indicates at least one group of channels/RSs. Table 1 and Table 2 are examples for illustrating the grouping codepoint. For example, it is assumed that the plurality of TCI states are TCI states TCI_state_A and TCI_state_B and the grouping codepoint is "5". According to the table 1, the 1st group of channels/RSs and the 3rd group of channels/RSs are associated with the TCI state TCI_state_A, and the 2nd group of channels/RSs and the 4th group of channels/RSs are associated with the TCI state TCI_state_B. According to the table 2, the 1st group of channels/RSs and the 2nd group of channels/RSs are associated with the TCI state TCI_state_A, and the 1st group of channels/RSs is associated with the TCI state TCI_state_B.

TABLE 1

| Grouping codepoint | Group(s) of channels/RSs associated with TCI_state_A | Group(s) of channels/RSs associated with TCI_state_B |
|---|---|---|
| 0 | Null | 1, 2, 3, 4 |
| 1 | 1 | 2, 3, 4 |
| 2 | 2 | 1, 3, 4 |
| 3 | 3 | 1, 2, 3 |
| 4 | 1, 2 | 3, 4 |
| 5 | 1, 3 | 2, 4 |
| 6 | 1, 4 | 2, 3 |

TABLE 1-continued

| Grouping codepoint | Group(s) of channels/RSs associated with TCI_state_A | Group(s) of channels/RSs associated with TCI_state_B |
|---|---|---|
| 7 | 2, 3 | 1, 4 |
| 8 | 3, 4 | 1, 2 |
| 9 | 1, 2, 3 | 4 |
| 10 | 1, 2, 4 | 3 |
| 11 | 1, 3, 4 | 2 |
| 12 | 2, 3, 4 | 1 |
| 13 | 1, 2, 3, 4 | Null |

TABLE 2

| Grouping codepoint | Group(s) of channels/RSs associated with TCI_state_A | Group(s) of channels/RSs associated with TCI_state_B |
|---|---|---|
| 0 | Null | 1, 2 |
| 1 | 1 | 1, 2 |
| 2 | 2 | 1, 2 |
| 3 | 1, 2 | 1, 2 |
| 4 | 1, 2 | 2 |
| 5 | 1, 2 | 1 |
| 6 | 1, 2 | Null |
| 7 | Null | 1, 2 |

In one example, the DCI comprises a TCI field with a TCI codepoint, a first grouping field with a first grouping codepoint and a second grouping field with a second grouping codepoint. The TCI codepoint indicates at least one TCI state of a plurality of TCI states. The first grouping codepoint indicates at least one group of channels/RSs associated with a first one of the plurality of TCI states. The grouping codepoint indicates at least one group of channels/RSs associated with a second one of the plurality of TCI states. Table 3 and Table 4 are examples for illustrating the first grouping codepoint and the second grouping codepoint, respectively. For example, it is assumed that the plurality of TCI states are TCI states TCI_state_C and TCI_state_D, the first grouping codepoint is "4", and the second grouping codepoint is "6". According to the table 3 and the table 4, the 1st group of channels/RSs and the 2nd group of channels/RSs are associated with the TCI state TCI_state_C, and the 2nd group of channels/RSs and the 3rd group of channels/RSs are associated with the TCI state TCI_state_D.

TABLE 3

| First grouping codepoint | Group(s) of channels/RSs associated with TCI_state_C |
|---|---|
| 0 | Null |
| 1 | 1 |
| 2 | 2 |
| 3 | 3 |
| 4 | 1, 2 |
| 5 | 1, 3 |
| 6 | 2, 3 |
| 7 | 1, 2, 3 |

TABLE 4

| Second grouping codepoint | Group(s) of channels/RSs associated with TCI_state_D |
|---|---|
| 0 | Null |
| 1 | 1 |
| 2 | 2 |
| 3 | 3 |
| 4 | 1, 2 |

TABLE 4-continued

| Second grouping codepoint | Group(s) of channels/RSs associated with TCI_state_D |
|---|---|
| 5 | 1, 3 |
| 6 | 2, 3 |
| 7 | 1, 2, 3 |

The Tables 1-4 illustrate examples of the grouping codepoint(s), and do not limit the present invention.

In one example, a SSSG mentioned above (e.g., the first SSSG or the second SSSG) may be a search space group (SSG), a CORESET, a CORESET pool index or a CORESET group, but is not limited herein. In one example, an index or an identity (ID) mentioned above may be a CORESET pool index, an ID of a TRP or an ID of a panel, but is not limited herein. In one example, the communication device may be configured with at least one following for the multi-TRP: a set of CORESET pool index, a set of TRP and a set of panel, but is not limited herein.

Figure 7:
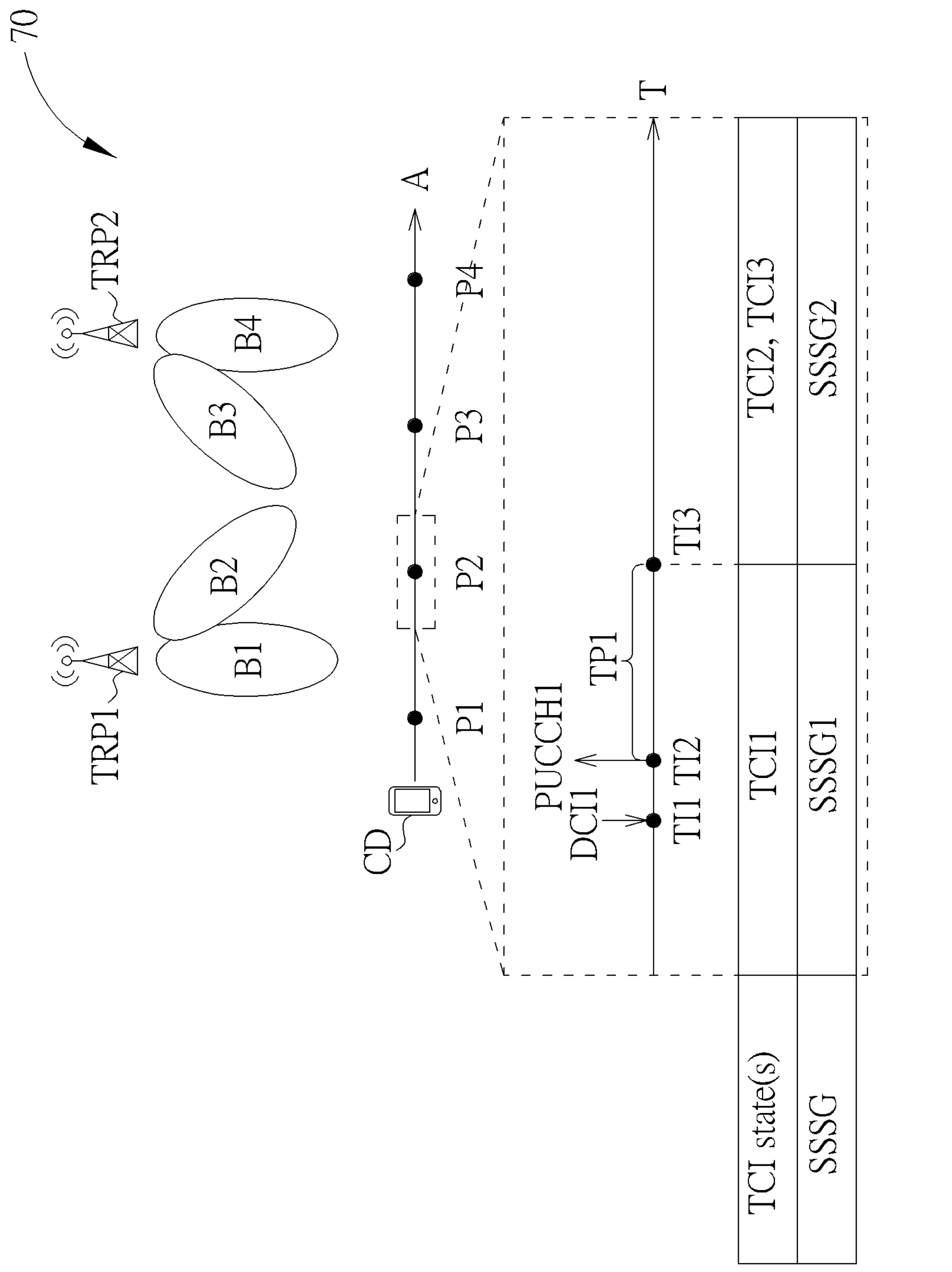
FIG. 7 is a schematic diagram of a scenario for handling SSSG and TCI state according to an example of the present invention.

FIG. 7 is a schematic diagram of a scenario 70 for handling SSSG and TCI state according to an example of the present invention. FIG. 7 may be applied to FIGS. 1-6. In FIG. 7, there are a communication device CD and a network (not shown) with two TRPs TRP1-TRP2. The TRP TRP1 comprises beams B1-B2, and the TRP TRP2 comprises beams B3-B4. TCI states TCI1-TCI4 and SSSGs SSSG1-SSSG2 are used for performing a single-TPR operation or a multi-TPR operation. The TCI states TCI1-TCI4 are associated with the beams B1-B4, respectively. A SSSG SSSG1 is associated with one of the TCI states TCI1-TCI4, and a SSSG SSSG2 is associated with at least two of the TCI states TCI1-TCI4. The communication device CD moves from left to right according to a moving direction arrow A. There are location points P1-P4 in the moving direction arrow A. The communication device CD performs a single-TPR operation with the TRP TRP1 between the location points P1-P2, performs a multi-TPR operation with the TRPs TRP1-TRP2 between the location points P2-P3, and performs a single-TPR operation with the TRP TRP2 between the location points P3-P4. In addition, there are time instants TI1-TI3 and a time period TP1 in a time dimension T.

In FIG. 7, between the location points P1-P2 (e.g., before the time instant TI3), the communication device CD performs the single-TPR operation with the TRP TRP1 according to the TCI state TCI1 and the SSSG SSSG1 (e.g., monitors the SSSG SSSG1 according to the TCI state TCI1). At the time instant TI1, the communication device CD receives a DCI DCI1 from the TRP TRP1. At the time instant TI2, the communication device CD transmits a PUCCH PUCCH1 with a HARQ feedback corresponding to the DCI DCI1 to the TRP TRP1.

In one example, the DCI DCI1 comprises a TCI field (or a TCI indication) with a TCI codepoint indicating the TCI states TCI2-TCI3. At the time instant TI3, the communication device CD switches to the SSSG SSSG2 in response to the TCI field indicating at least two of the TCI states TCI1-TCI4.

In one example, the DCI DCI1 comprises the TCI field (or the TCI indication) with the TCI codepoint indicating the TCI states TCI2-TCI3, and comprises a SSSG switching field indicating the SSSG2. At the time instant TI3, the communication device CD switches to the SSSG SSSG2 in response to the SSSG switching field indicating the SSSG2.

Thus, between the location points P2-P3 (e.g., after the time instant TI3), the communication device CD performs the multi-TPR operation with the TRPs TRP1-TRP2 according to the TCI states TCI2-TCI3 and the SSSG SSSG2 (e.g., monitors the SSSG SSSG2 according to the TCI states TCI2-TCI3). In addition, the time period TP1 between the time instants T12-TI3 is a time for beam application. After the time period TP1 from a last symbol of the PUCCH PUCCH1, the communication device CD applies the TCI states TCI2-TCI3 indicated by the DCI DCI1 and/or switches the SSSG.

Figure 8:
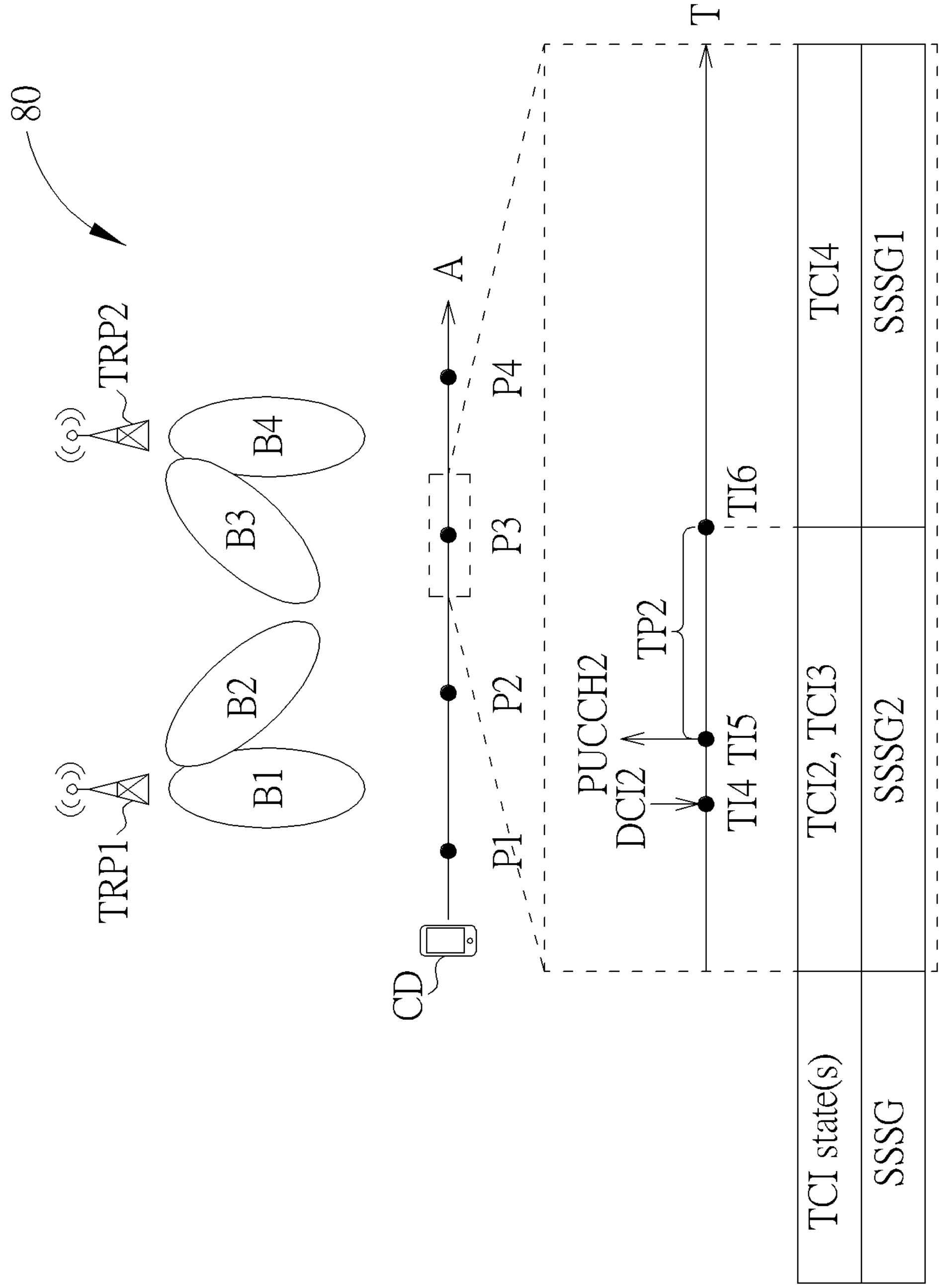
FIG. 8 is a schematic diagram of a scenario for handling SSSG and TCI state according to an example of the present invention.

FIG. 8 is a schematic diagram of a scenario 80 for handling SSSG and TCI state according to an example of the present invention. FIG. 8 may be applied to FIGS. 1-7. In FIG. 8, a communication device CD, a network (not shown) with two TRPs TRP1-TRP2, beams B1-B4, TCI states TCI1-TCI4, SSSGs SSSG1-SSSG2, a moving direction arrow A and location points P1-P4 can be referred to FIG. 7, and not narrated herein for brevity. In addition, there are time instants T14-TI6 and a time period TP2 in a time dimension T.

In FIG. 8, between the location points P2-P3 (e.g., before the time instant TI6), the communication device CD performs the multi-TPR operation with the TRPs TRP1-TRP2 according to the TCI states TCI2-TCI3 and the SSSG SSSG2 (e.g., monitors the SSSG SSSG2 according to the TCI states TCI2-TCI3). At the time instant TI4, the communication device CD receives a DCI DCI2 from the TRP TRP1 and/or the TRP TRP2. At the time instant TI5, the communication device CD transmits a PUCCH PUCCH2 with a HARQ feedback corresponding to the DCI DCI2 to the TRP TRP1 and/or the TRP TRP2.

In one example, the DCI DCI2 comprises a TCI field (or a TCI indication) with a TCI codepoint indicating the TCI state TCI4. At the time instant TI6, the communication device CD switches to the SSSG SSSG1 in response to the TCI field indicating one of the TCI states TCI1-TCI4.

In one example, the DCI DCI2 comprises the TCI field (or the TCI indication) with the TCI codepoint indicating the TCI state TCI4, and comprises a SSSG switching field indicating the SSSG SSSG1. At the time instant TI6, the communication device CD switches to the SSSG SSSG1 in response to the SSSG switching field indicating the SSSG SSSG1.

Thus, between the location points P3-P4 (e.g., after the time instant TI6), the communication device CD performs the single-TPR operation with the TRP TRP2 according to the TCI state TCI4 and the SSSG SSSG1 (e.g., monitors the SSSG SSSG1 according to the TCI state TCI4). In addition, the time period TP2 between the time instants T15-TI6 is a time for beam application. After the time period TP2 from a last symbol of the PUCCH PUCCH2, the communication device CD applies the TCI state TCI4 indicated by the DCI DCI2 and/or switches the SSSG.

Figure 9:
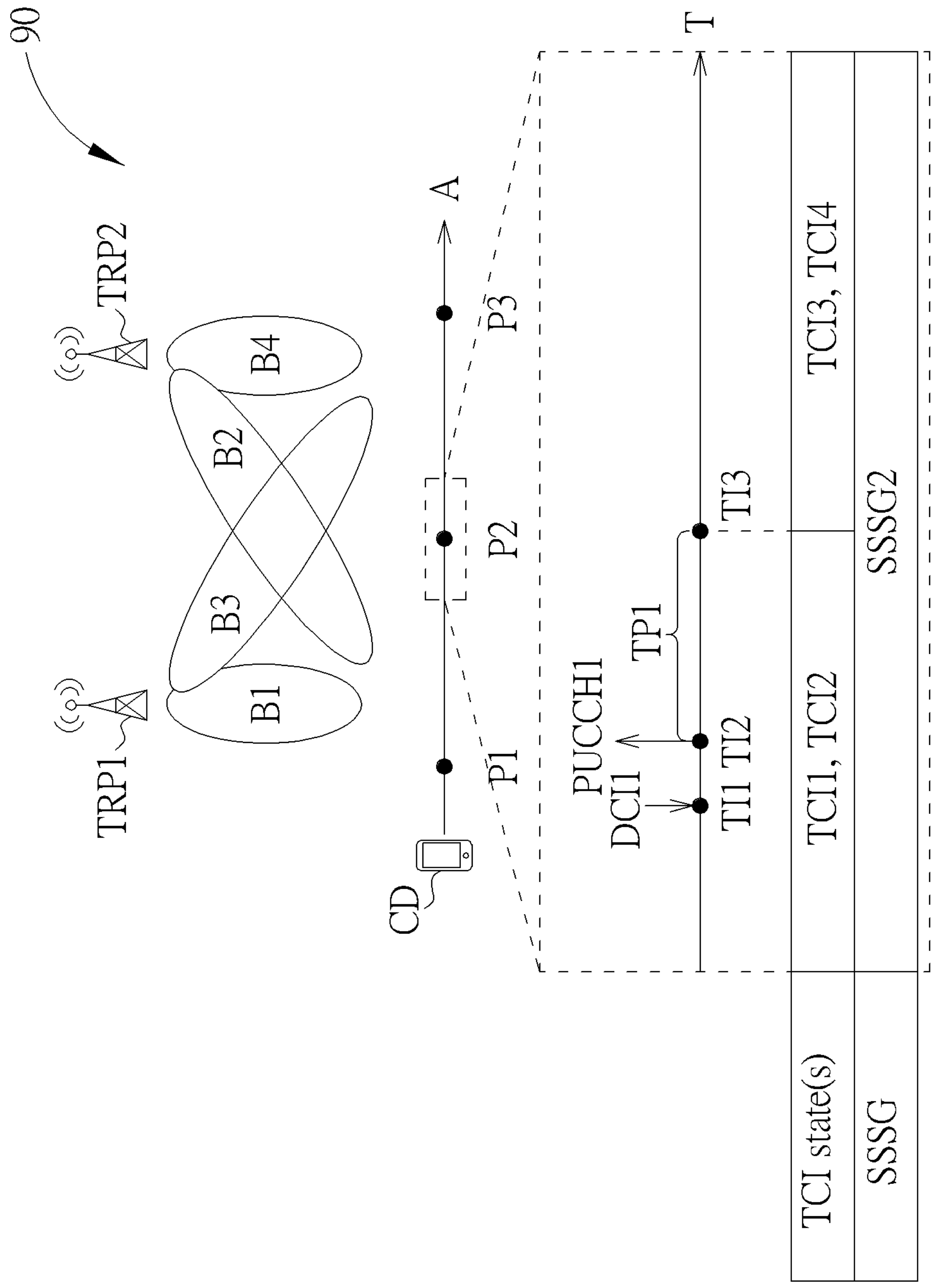
FIG. 9 is a schematic diagram of a scenario for handling SSSG and TCI state according to an example of the present invention.

FIG. 9 is a schematic diagram of a scenario 90 for handling SSSG and TCI state according to an example of the present invention. FIG. 9 may be applied to FIGS. 1-6. In FIG. 9, there are a communication device CD and a network (not shown) with two TRPs TRP1-TRP2. The TRP TRP1 comprises beams B1 and B3, and the TRP TRP2 comprises beams B2 and B4. TCI states TCI1-TCI4 and SSSGs SSSG1-SSSG2 are used for performing a single-TPR operation or a multi-TPR operation. The TCI states TCI1-TCI4 are associated with the beams B1-B4, respectively. A SSSG SSSG1 is associated with one of the TCI states TCI1-TCI4, and a SSSG SSSG2 is associated with at least two of the TCI states TCI1-TCI4. The communication device CD moves from left to right according to a moving direction arrow A. There are location points P1-P3 in the moving direction arrow A. The communication device CD performs a multi-TPR operation with the TRP TRP1-TRP2 (e.g., the beam B1 of the TRP TRP1 and the beam B2 of the TRP TRP2) between the location points P1-P2, and performs a multi-TPR operation with the TRPs TRP1-TRP2 (e.g., the beam B3 of the TRP TRP1 and the beam B4 of the TRP TRP2) between the location points P2-P3. In addition, there are time instants TI1-TI3 and a time period TP in a time dimension T.

In FIG. 9, between the location points P1-P2 (e.g., before the time instant TI3), the communication device CD performs the multi-TPR operation with the TRPs TRP1-TRP2 according to the TCI states TCI1-TCI2 and the SSSG SSSG2 (e.g., monitors the SSSG SSSG2 according to the TCI states TCI1-TCI2). At the time instant TI1, the communication device CD receives a DCI DCI1 from the TRP TRP1 and/or the TRP TRP2. At the time instant TI2, the communication device CD transmits a PUCCH PUCCH1 with a HARQ feedback corresponding to the DCI DCI1 to the TRP TRP1 and/or the TRP TRP2.

In one example, the DCI DCI1 comprises a TCI field (or a TCI indication) with a TCI codepoint indicating the TCI states TCI3-TCI4. At the time instant TI3, the communication device CD does not change the SSSG SSSG2 in response to the TCI field indicating at least two of the TCI states TCI1-TCI4.

In one example, the DCI DCI1 comprises the TCI field (or the TCI indication) with the TCI codepoint indicating the TCI states TCI3-TCI4, and comprises a SSSG switching field indicating the SSSG SSSG2. At the time instant TI3, the communication device CD does not change the SSSG SSSG2 in response to the SSSG switching field in the DCI DCI1 indicating the SSSG SSSG2.

Thus, between the location points P2-P3 (e.g., after the time instant TI3), the communication device CD performs the multi-TPR operation with the TRPs TRP1-TRP2 according to the TCI states TCI3-TCI4 and the SSSG SSSG2 (e.g., monitors the SSSG SSSG2 according to the TCI states TCI3-TCI4). In addition, the time period TP between the time instants T12-TI3 is a time for beam application. After the time period TP from a last symbol of the PUCCH PUCCH1, the communication device CD applies the TCI states TCI3-TCI4 indicated by the DCI DCI1.

Figure 10:
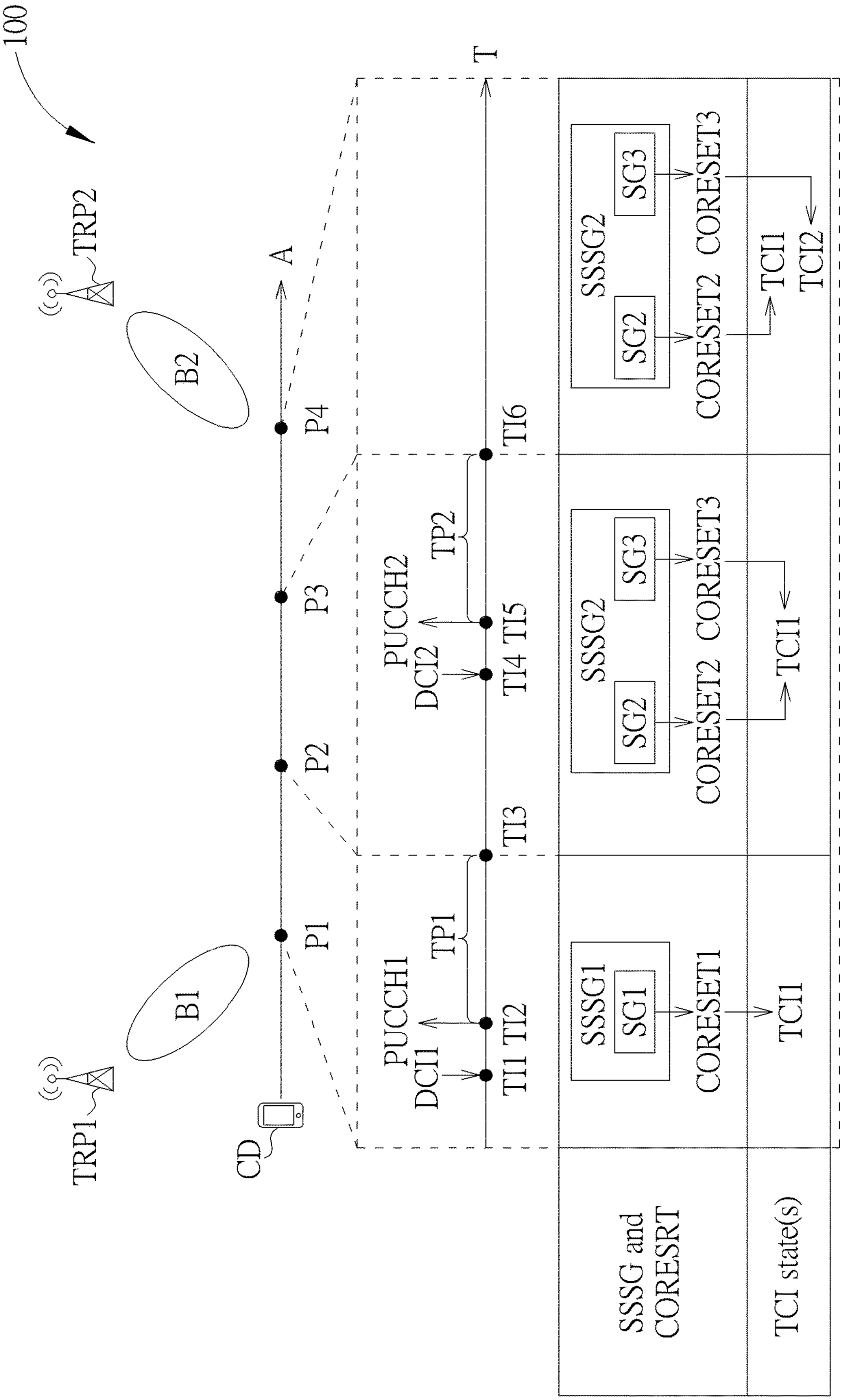
FIG. 10 is a schematic diagram of a scenario for handling SSSG and TCI state according to an example of the present invention.

FIG. 10 is a schematic diagram of a scenario 100 for handling SSSG and TCI state according to an example of the present invention. FIG. 10 may be applied to FIGS. 1-9. In FIG. 10, there are a communication device CD and a network (not shown) with two TRPs TRP1-TRP2. The TRP TRP1 comprises beam B1, and the TRP TRP2 comprises beam B2. TCI states TCI1-TCI2 and SSSGs SSSG1-SSSG2 are used for performing a single-TPR operation or a multi-TPR operation. The TCI states TCI1-TCI2 are associated with the beams B1-B2, respectively. A SSSG SSSG1 is associated with one of the TCI states TCI1-TCI2, and a SSSG SSSG2 is associated with the TCI states TCI1-TCI2. The communication device CD moves from left to right according to a moving direction arrow A. There are location points P1-P4 in the moving direction arrow A. A coverage of the beam B1 comprises an area between the location points P1 and P4, and a coverage of the beam B2 comprises an area is between the location points P3 and P4. The communication device CD performs a single-TPR operation with the TRP TRP1 (e.g., the beam B1 of the TRP TRP1) between the location points P1 and P3, and performs a multi-TPR operation with the TRPs TRP1-TRP2 (e.g., the beam B1 of the TRP TRP1 and the beam B2 of the TRP TRP2) between the location points P3-P4. In addition, there are time instants TI1-TI6 and time periods TP1-TP2 in a time dimension T.

In FIG. 10, between the location points P1-P2 (e.g., before the time instant TI3), the communication device CD monitors a subgroup SG1 of the SSSG SSSG1 according to the TCI state TCI1. The subgroup SG1 of the SSSG SSSG1 is associated with a CORESET CORESET1, and the CORESET CORESET1 is associated with the TCI state TCI1. At the time instant TI1, the communication device CD receives a DCI DCI1 from the TRP TRP1. The DCI DCI1 comprises a TCI field (or a TCI indication) with a TCI codepoint indicating the TCI state TCI1, and comprises a SSSG switching field indicating the SSSG SSSG2. At the time instant TI2, the communication device CD transmits a PUCCH PUCCH1 with a HARQ feedback corresponding to the DCI DCI1. At the time instant TI3, the communication device CD switches to the SSSG SSSG2 in response to the SSSG switching field indicating the SSSG SSSG2. In detail, between the location points P2-P3 (e.g., between the time instants 113 and TI6), the communication device CD monitors subgroups SG2-SG3 of the SSSG SSSG2 according to the TCI state TCI1. At least one SS set in the subgroup SG2 corresponds to at least one SS set in the subgroup SG3, respectively. The subgroups SG2-SG3 of the SSSG SSSG2 are associated with CORESETs CORESET2-CORESET3, respectively, and the CORESETs CORESET2-CORESET3 are associated with the TCI state TCI1.

In FIG. 10, at the time instant TI4, the communication device CD receives a DCI DCI2 from the TRP TRP1. The DCI DCI2 comprises a TCI field (or a TCI indication) with a TCI codepoint indicating the TCI states TCI1-TCI2, and comprises a SSSG switching field indicating the SSSG SSSG2. At the time instant TI5, the communication device CD transmits a PUCCH PUCCH2 with a HARQ feedback corresponding to the DCI DCI2. At the time instant TI6, the communication device CD does not change the SSSG SSSG2 in response to the SSSG switching field indicating the SSSG SSSG2. In detail, between the location points P3-P4 (e.g., after the time instant TI6), the communication device CD monitors the subgroups SG2-SG3 of the SSSG SSSG2 according to the TCI states TCI1-TCI2. The subgroups SG2-SG3 of the SSSG SSSG2 are associated with the CORESETs CORESET2-CORESET3, respectively, and the CORESETs CORESET2-CORESET3 are associated with the TCI states TCI1-TCI2, respectively. In addition, the time periods TP1-TP2 in FIG. 10 can be referred to FIGS. 7-9, and not narrated herein for brevity.

Figure 11:
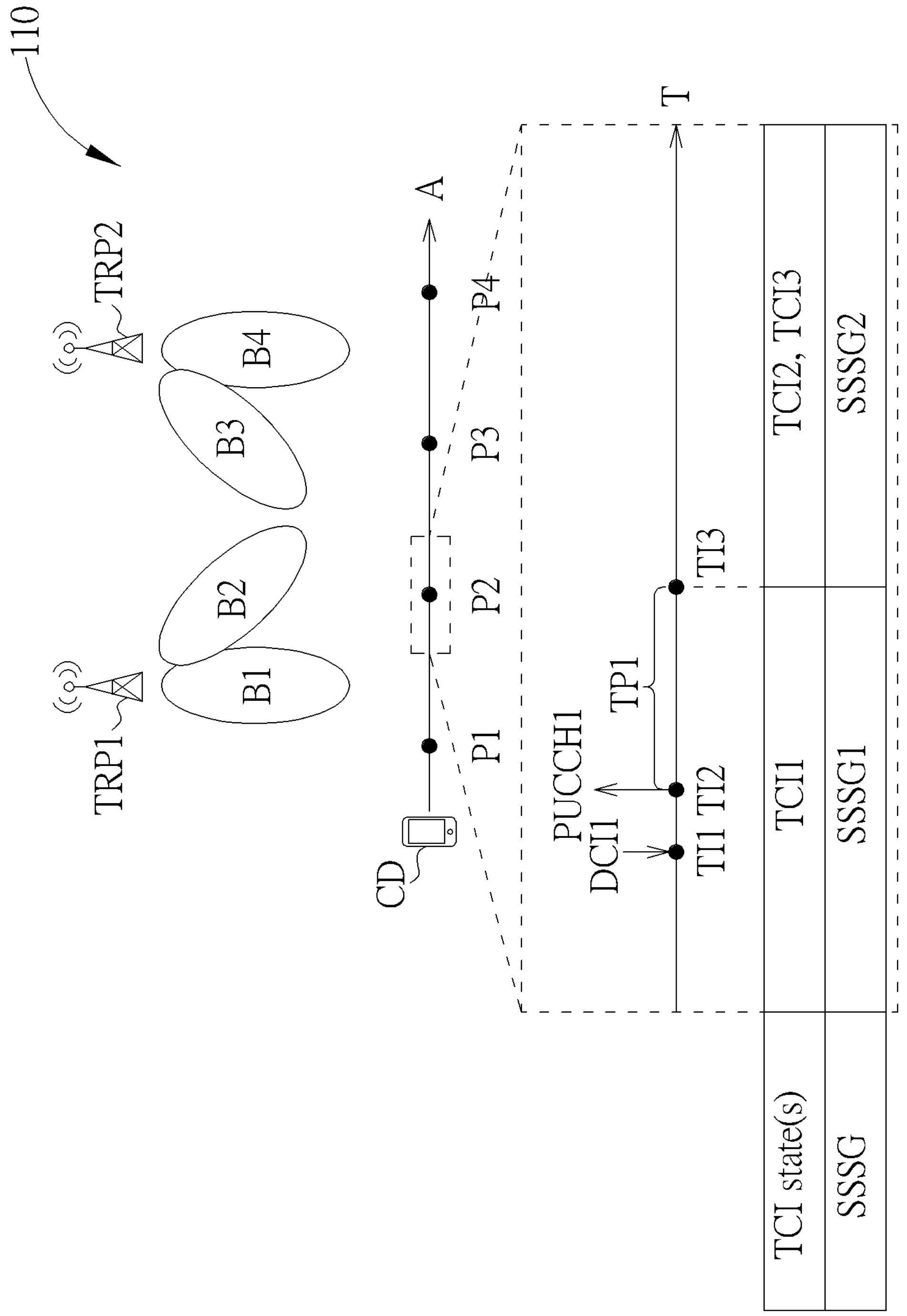
FIG. 11 is a schematic diagram of a scenario for handling SSSG and TCI state according to an example of the present invention.

FIG. 11 is a schematic diagram of a scenario 110 for handling SSSG and TCI state according to an example of the present invention. FIG. 11 may be applied to FIGS. 1-6. In FIG. 11, a communication device CD, a network (not shown) with two TRPs TRP1-TRP2, beams B1-B4, TCI states TCI1-TCI4, SSSGs SSSG1-SSSG2, a moving direction arrow A and location points P1-P4 can be referred to FIG. 7, and not narrated herein for brevity. In addition, there are time instants TI1-TI3 and a time period TP1 in a time dimension T.

In FIG. 11, between the location points P1-P2 (e.g., before the time instant TI3), the communication device CD performs the single-TPR operation with the TRP TRP1 according to the TCI state TCI1 and the SSSG SSSG1 (e.g., monitors the SSSG SSSG1 according to the TCI state TCI1). At the time instant TI1, the communication device CD receives a DCI DCI1 from the TRP TRP1. The DCI DCI1 comprises a TCI field (or a TCI indication) with a TCI codepoint indicating the TCI states TCI2-TCI3, and comprises a time period field indicating the time period TP1. At the time instant TI2, the communication device CD transmits a PUCCH PUCCH1 with a HARQ feedback corresponding to the DCI DCI1. At the time instant TI3, the communication device CD switches to the SSSG SSSG2 in response to the TCI field indicating at least two of the TCI states TCI1-TCI4. The time period TP1 starts from the time instant 112 of transmitting the PUCCH PUCCH1, and ends at the time instant TI3. Thus, at the time instant TI3, the communication device CD switches to the SSSG SSSG2 according to the time instant TI2 and the time period TP1. Between the location points P2-P3 (e.g., after the time instant TI3), the communication device CD performs the multi-TPR operation with the TRPs TRP1-TRP2 according to the TCI states TCI2-TCI3 and the SSSG SSSG2 (e.g., monitors the SSSG SSSG2 according to the TCI states TCI2-TCI3).

Figure 12:
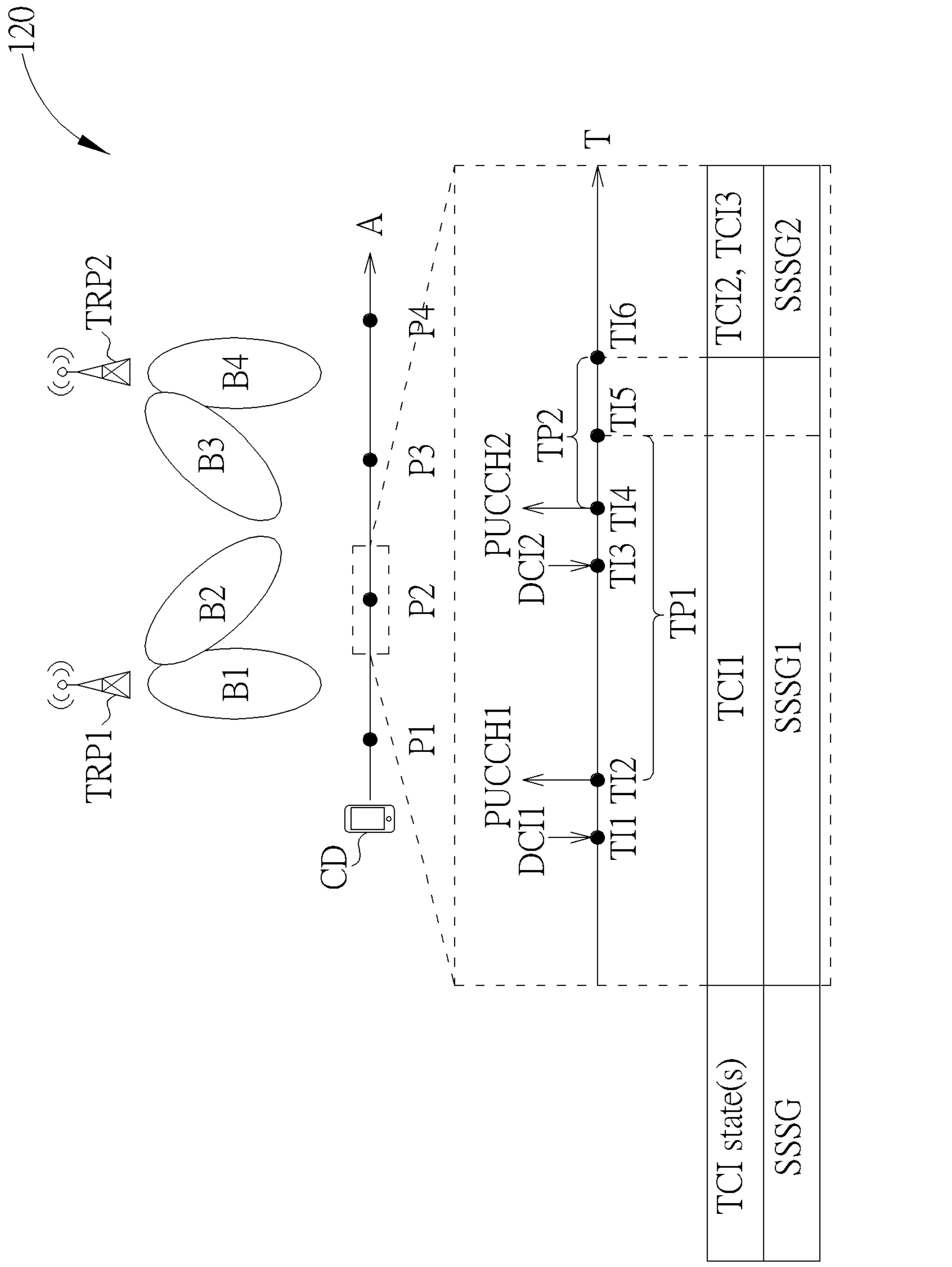
FIG. 12 is a schematic diagram of a scenario for handling SSSG and TCI state according to an example of the present invention.

FIG. 12 is a schematic diagram of a scenario 120 for handling SSSG and TCI state according to an example of the present invention. FIG. 12 may be applied to FIGS. 1-6 and 11. In FIG. 12, a communication device CD, a network (not shown) with two TRPs TRP1-TRP2, beams B1-B4, TCI states TCI1-TCI4, SSSGs SSSG1-SSSG2, a moving direction arrow A and location points P1-P4 can be referred to FIG. 11, and not narrated herein for brevity. In addition, there are time instants TI1-TI6 and time periods TP1-TP2 in a time dimension T.

In FIG. 12, between the location points P1-P2 (e.g., before the time instant TI6), the communication device CD performs the single-TPR operation with the TRP TRP1 according to the TCI state TCI1 and the SSSG SSSG1 (e.g., monitors the SSSG SSSG1 according to the TCI state TCI1). At the time instant TI1, the communication device CD receives a DCI DCI1 from the TRP TRP1. The DCI DCI1 comprises a TCI field (or a TCI indication) with a TCI codepoint indicating the TCI states TCI2-TCI3, and comprises a time period field indicating the time period TP1. At the time instant TI2, the communication device CD transmits a PUCCH PUCCH1 with a HARQ feedback corresponding to the DCI DCI1. Thus, the communication device CD schedules to switch to the SSSG SSSG2 at the time instant TI5 according to the time instant TI2 and the time period TP1.

Then, the communication device CD receives a DCI DCI2 from the TRP TRP1 at the time instant TI3, e.g., in response to a speed change of the communication device CD. The DCI DCI2 comprises a TCI field (or a TCI indication) with a TCI codepoint indicating the TCI states TCI2-TCI3, and comprises a time period indicating the time period TP2. At the time instant TI4, the communication device CD transmits a PUCCH PUCCH2 with a HARQ feedback corresponding to the DCI DCI2. Thus, the communication device CD switches to the SSSG SSSG2 at the time instant TI6 according to the time instant TI4 and the time period TP2. Between the location points P2-P3 (e.g., after the time instant TI6), the communication device CD performs the multi-TPR operation with the TRPs TRP1-TRP2 according to the TCI states TCI2-TCI3 and the SSSG SSSG2 (e.g., monitors the SSSG SSSG2 according to the TCI states TCI2-TCI3).

In FIG. 12, the time instant of performing the SSSG switching is changed (e.g., delayed or advanced) from the time instant 115 to the time instant TI6, e.g., in response to the speed change of the communication device CD.

Figure 13:
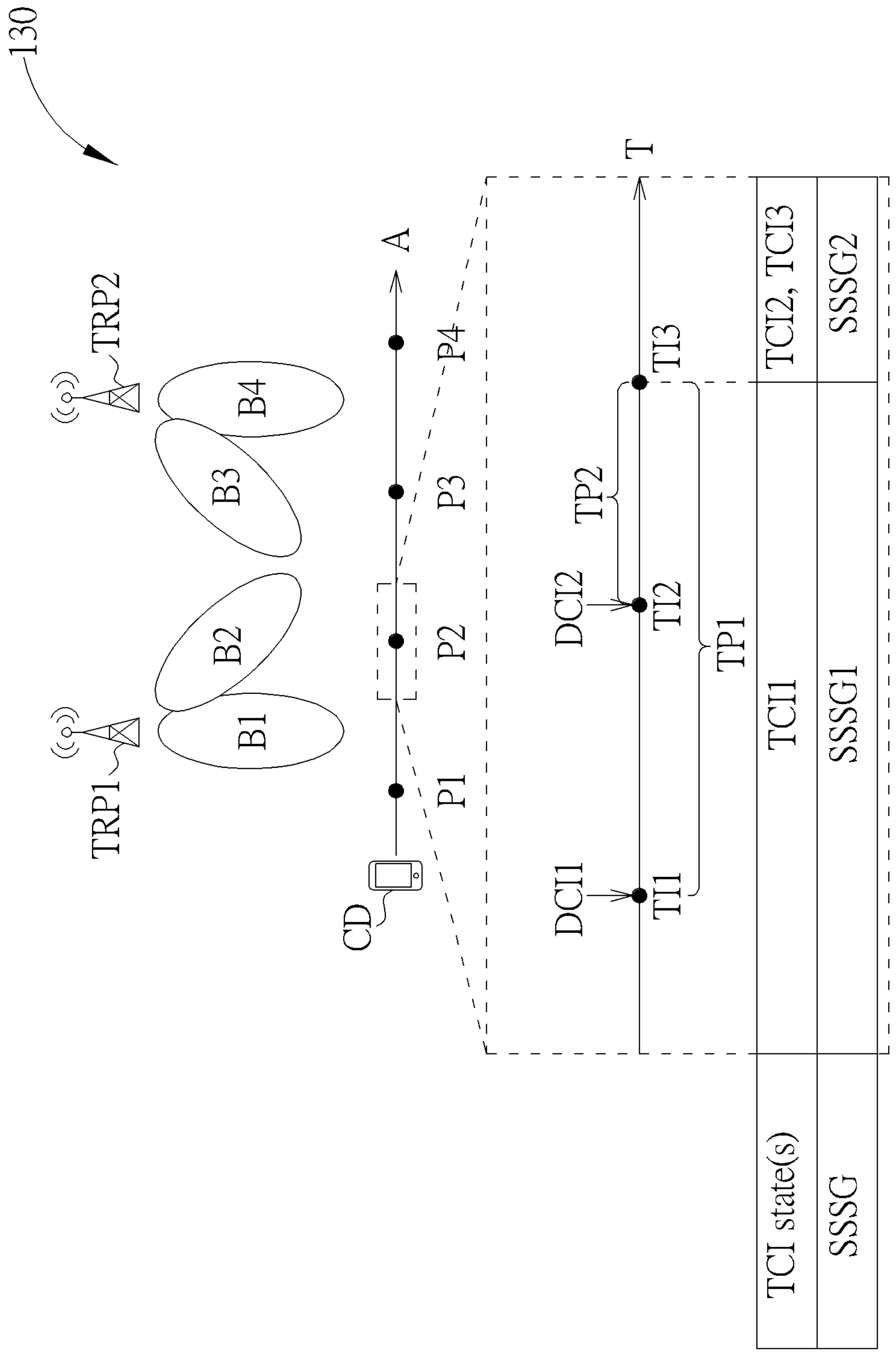
FIG. 13 is a schematic diagram of a scenario for handling SSSG and TCI state according to an example of the present invention.

FIG. 13 is a schematic diagram of a scenario 130 for handling SSSG and TCI state according to an example of the present invention. FIG. 13 may be applied to FIGS. 1-6 and 11. In FIG. 13, a communication device CD, a network (not shown) with two TRPs TRP1-TRP2, beams B1-B4, TCI states TCI1-TCI4, SSSGs SSSG1-SSSG2, a moving direction arrow A and location points P1-P4 can be referred to FIG. 11, and not narrated herein for brevity. In addition, there are time instants TI1-TI3 and time periods TP1-TP2 in a time dimension T.

In FIG. 13, between the location points P1-P2 (e.g., before the time instant TI3), the communication device CD performs the single-TPR operation with the TRP TRP1 according to the TCI state ICI1 and the SSSG SSSG1 (e.g., monitors the SSSG SSSG1 according to the TCI state TCI1). At the time instant TI1, the communication device CD receives a DCI DCI1 from the TRP TRP1. The DCI DCI1 comprises a TCI field (or a TCI indication) with a TCI codepoint indicating the TCI states TCI2-TCI3, and comprises a time period field indicating the time period TP1. The time period TP1 is a time period starts from the time instant TI1 of receiving the DCI DCI1, and ends at the time instant TI3.

In addition, at the time instant TI2, the communication device CD receives a DCI DCI2 from the TRP TRP1. The DCI DCI2 comprises a TCI field (or a TCI indication) with a TCI codepoint indicating the TCI states TCI2-TCI3, and comprises a time period field indicating the time period TP2. The time period TP2 starts from the time instant TI2 of receiving the DCI DCI2, and ends at the time instant TI3. Ends of the time periods TP1-TP2 are the same. Thus, the communication device CD switches to the SSSG SSSG2 at the time instant TI3. Between the location points P2-P3 (e.g., after the time instant TI3), the communication device CD performs the multi-TPR operation with the TRPs TRP1-TRP2 according to the TCI states TCI2-TCI3 and the SSSG SSSG2 (e.g., monitors the SSSG SSSG2 according to the TCI states TCI2-TCI3).

In FIG. 13, the communication device CD need not transmit a PUCCH with a HARQ feedback corresponding to a DCI. Thus, the network may transmit multiple DCIs to the communication device CD to prevent that the communication device CD from not receiving at least one of the DCIs.

Figure 14:
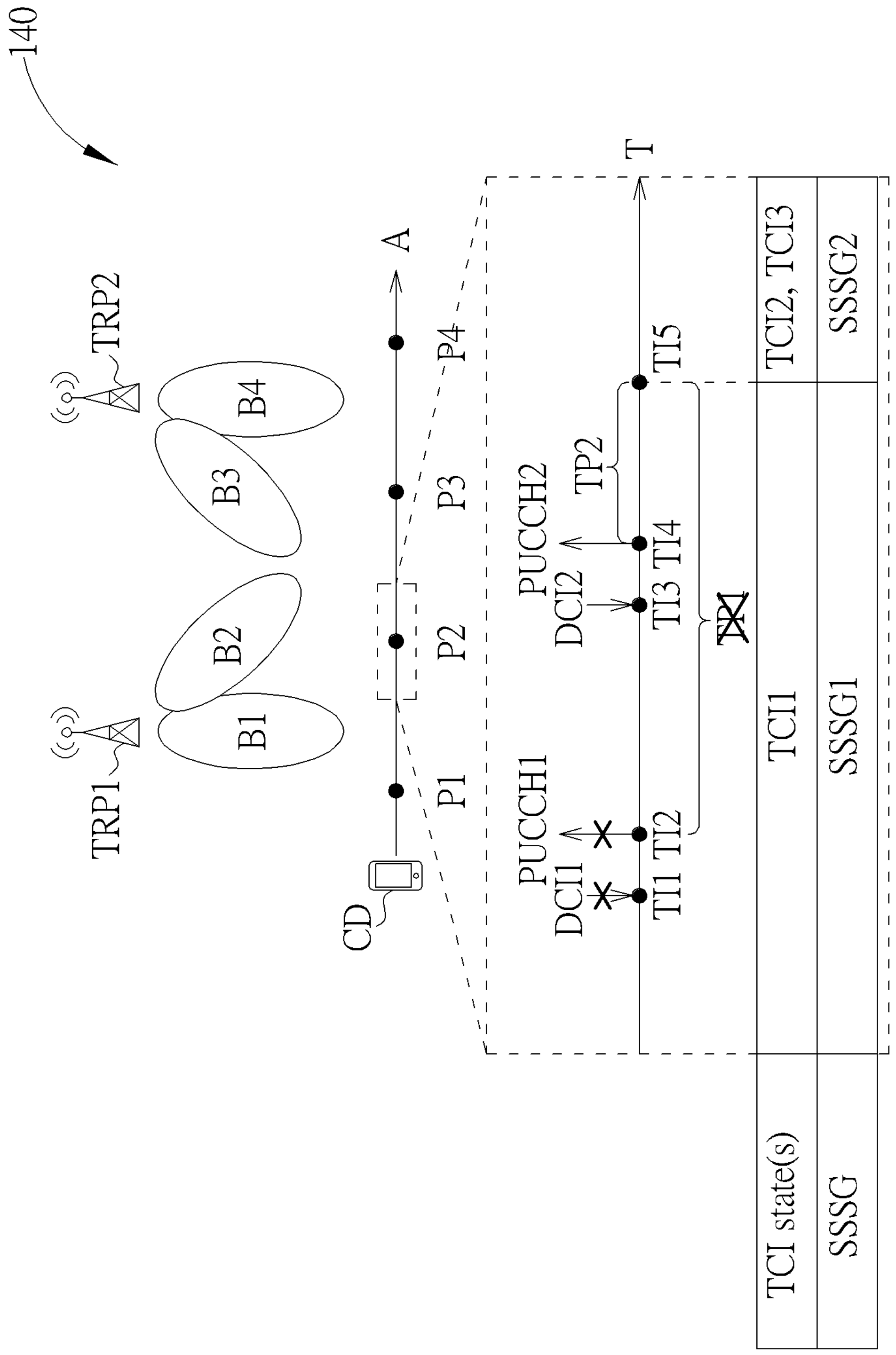
FIG. 14 is a schematic diagram of a scenario for handling SSSG and TCI state according to an example of the present invention.

FIG. 14 is a schematic diagram of a scenario 140 for handling SSSG and TCI state according to an example of the present invention. FIG. 14 may be applied to FIGS. 1-6 and 11. In FIG. 14, a communication device CD, a network (not shown) with two TRPs TRP1-TRP2, beams B1-B4, TCI states TCI1-TCI4, SSSGs SSSG1-SSSG2, a moving direction arrow A and location points P1-P4 can be referred to FIG. 11, and not narrated herein for brevity. In addition, there are time instants TI1-TI5 and time periods TP1-TP2 in a time dimension T.

In FIG. 14, between the location points P1-P2 (e.g., before the time instant TI5), the communication device CD performs the single-TPR operation with the TRP TRP1 according to the TCI state TCI1 and the SSSG SSSG1 (e.g., monitors the SSSG SSSG1 according to the TCI state TCI1). The TRP TRP1 transmits the DCI DCI1 to the communication device CD. The DCI DCI1 comprises a TCI field (or a TCI indication) with a TCI codepoint indicating the TCI states TCI2-TCI3, and comprises a time period indicating the time period TP1. However, the communication device CD fails to receive the DCI DCI1 at the time instant TI1, and thus does not transmit a PUCCH PUCCH1 with a HARQ feedback corresponding to the DCI DCI1 to the TRP TRP1 at the time instant TI2.

Then, the TRP TRP1 transmits the DCI DCI2 to the communication device CD. The DCI DCI2 comprises a TCI field (or a TCI indication) with a TCI codepoint indicating the TCI states TCI2-TCI3, and comprises a time period field indicating the time period TP2. The communication device CD receives the DCI DCI2 at the time instant TI3 successfully, and transmit a PUCCH PUCCH2 with a HARQ feedback corresponding to the DCI DCI2 to the TRP TRP1 at the time instant TI4. Thus, at the time instant TI5, the communication device CD switches to the SSSG SSSG2 according to the time instant TI4 and the time period TP2. Between the location points P2-P3 (e.g., after the time instant TI5), the communication device CD performs the multi-TPR operation with the TRPs TRP1-TRP2 according to the TCI states TCI2-TCI3 and the SSSG SSSG2 (e.g., monitors the SSSG SSSG2 according to the TCI states TCI2-TCI3).

Figure 15:
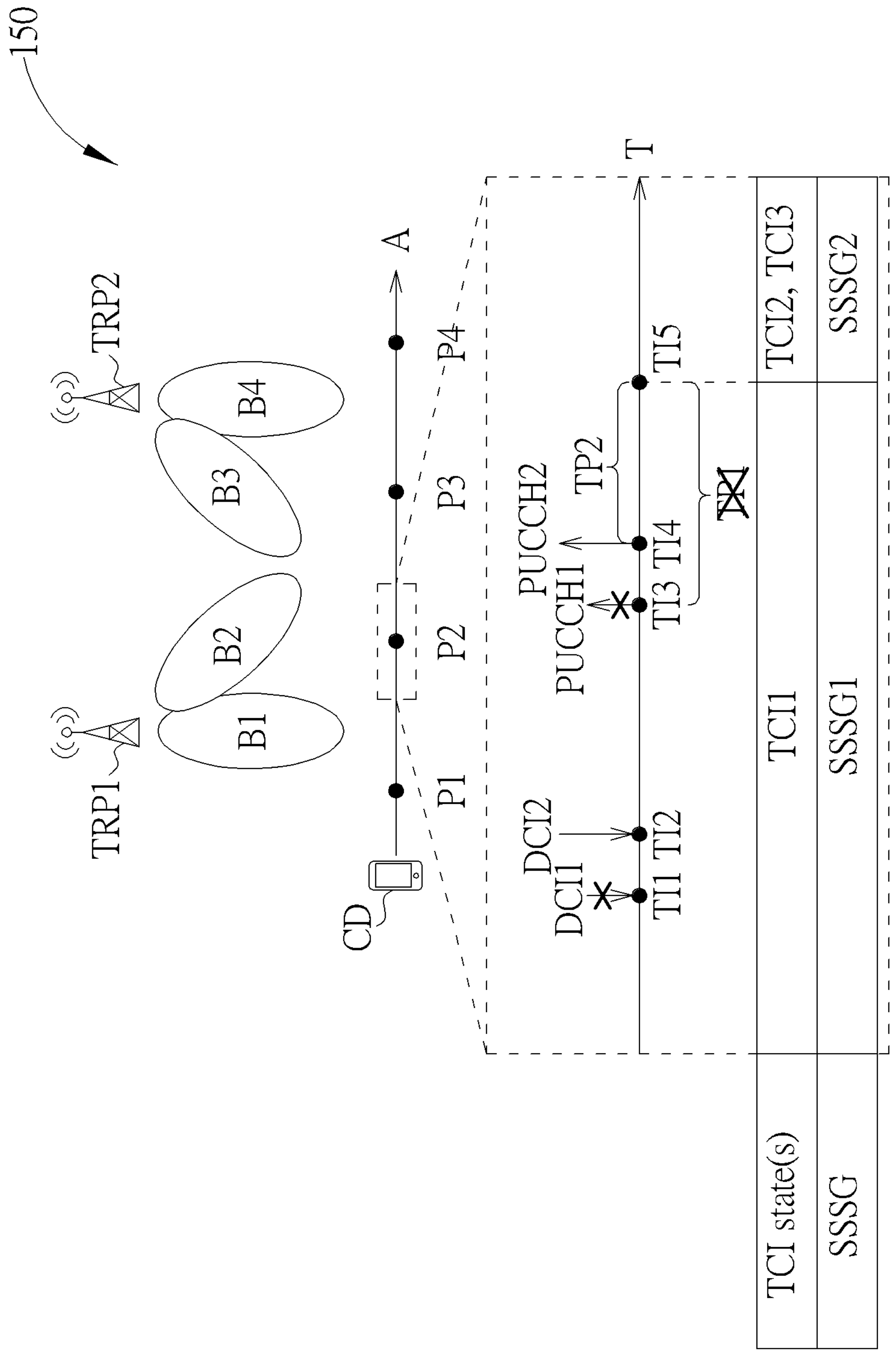
FIG. 15 is a schematic diagram of a scenario for handling SSSG and TCI state according to an example of the present invention.

FIG. 15 is a schematic diagram of a scenario 150 for handling SSSG and TCI state according to an example of the present invention. FIG. 15 may be applied to FIGS. 1-6 and 11. In FIG. 15, a communication device CD, a network (not shown) with two TRPs TRP1-TRP2, beams B1-B4, TCI states TCI1-TCI4, SSSGs SSSG1-SSSG2, a moving direction arrow A and location points P1-P4 can be referred to FIG. 11, and not narrated herein for brevity. In addition, there are time instants TI1-TI5 and time periods TP1-TP2 in a time dimension T.

In FIG. 15, the TRP TRP1 transmits the DCIs DCI1-DCI2 to the communication device CD. The DCI DCI1 comprises a TCI field (or a TCI indication) with a TCI codepoint indicating the TCI states TCI2-TCI3, and comprises a time period field indicating the time period TP1. The DCI DCI2 comprises a TCI field (or a TCI indication) with a TCI codepoint indicating the TCI states TCI2-TCI3, and comprises a time period field indicating the time period TP2. The communication device fails to receive the DCI DCI1 at the time instant TI1, and receives the DCI DCI1 successfully at the time instant TI2. The communication device does not transit a PUCCH1 with a HARQ feedback corresponding to the DCI DCI1 at the time instant TI3, and transit a PUCCH2 with a HARQ feedback corresponding to the DCI DCI2 at the time instant TI4. Thus, at the time instant TI5, the communication device CD switches to the SSSG SSSG2 according to the time instant TI4 and the time period TP2. Between the location points P2-P3 (e.g., after the time instant TI5), the communication device CD performs the multi-TPR operation with the TRPs TRP1-TRP2 according to the TCI states TCI2-TCI3 and the SSSG SSSG2 (e.g., monitors the SSSG SSSG2 according to the TCI states TCI2-TCI3).

Figure 16:
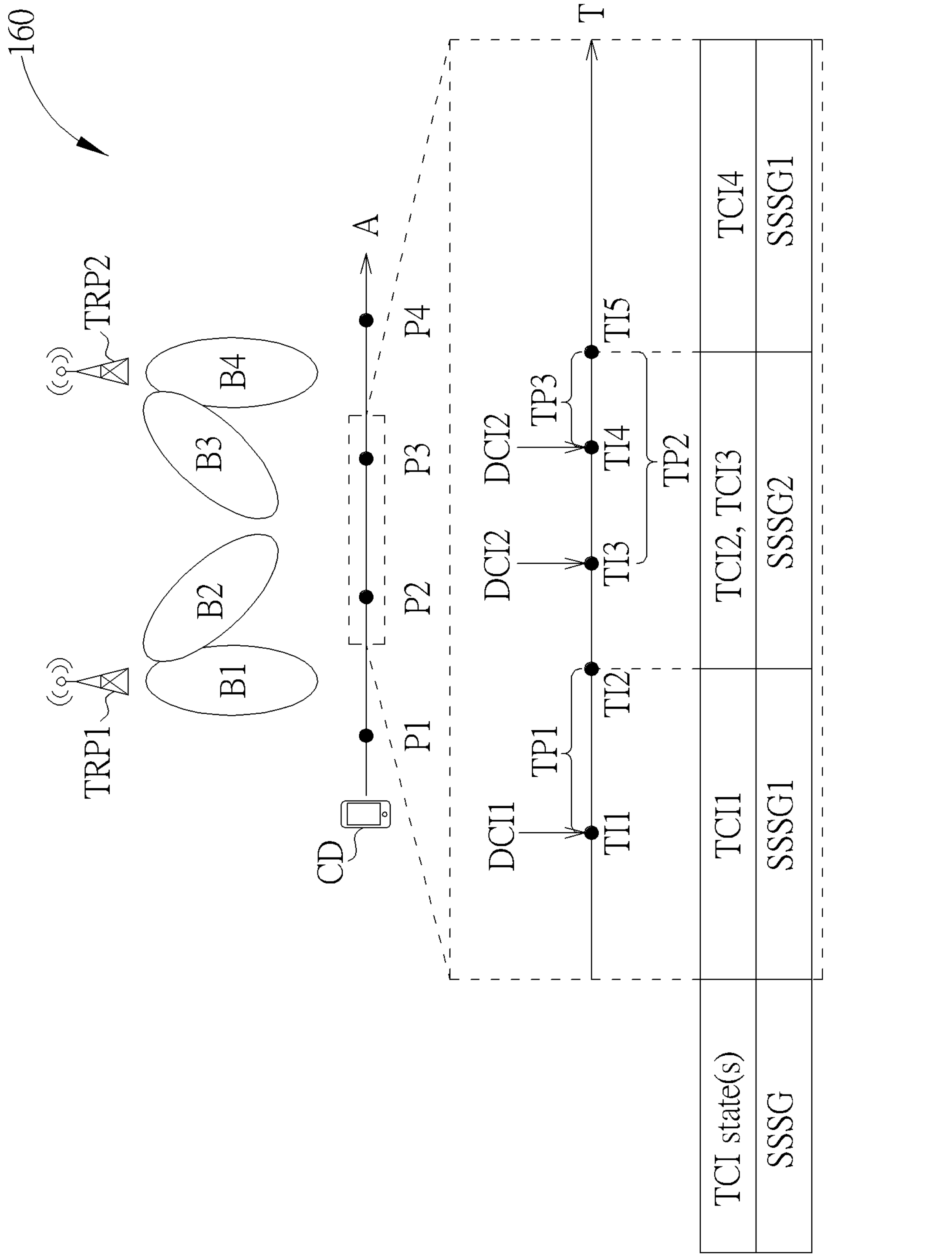
FIG. 16 is a schematic diagram of a scenario for handling SSSG and TCI state according to an example of the present invention.

FIG. 16 is a schematic diagram of a scenario 160 for handling SSSG and TCI state according to an example of the present invention. FIG. 16 may be applied to FIGS. 1-6. In FIG. 16, a communication device CD, a network (not shown) with two TRPs TRP1-TRP2, beams B1-B4, TCI states TCI1-TCI4, SSSGs SSSG1-SSSG2, a moving direction arrow A and location points P1-P4 can be referred to FIG. 7, and not narrated herein for brevity. In addition, there are time instants TI1-TI5 and time periods TP1-TP3 in a time dimension T.

In FIG. 16, between the location points P1-P2 (e.g., before the time instant TI2), the communication device CD performs the single-TPR operation with the TRP TRP1 according to the TCI state TCI1 and the SSSG SSSG1 (e.g., monitors the SSSG SSSG1 according to the TCI state TCI1). At the time instant TI1, the communication device CD receives a DCI DCI1 from the TRP TRP1. The DCI DCI1 comprises a time period field indicating the time period TP1. The time period TP1 starts from the time instant TI1 of receiving the DCI DCI1, and ends at the time instant TI2. Thus, at the time instant TI2, the communication device CD switches to the SSSG SSSG2, and perform the multi-TPR operation with the TRPs TRP1-TRP2 (e.g., monitors the SSSG SSSG2 according to the TCI states TCI2-TCI3).

In addition, the communication device CD receives a DCI DCI2 from the TRP TRP1 at the time instant TI3, and receives a DCI DCI3 from the TRP TRP1 at the time instant TI4. The DCI DCI2 comprises a time period field indicating the time period TP2, and the DCI DCI3 comprises a time period field indicating the time period TP3. The time period TP2 starts from the time instant TI3 of receiving the DCI DCI2, and ends at the time instant TI5. The time period TP3 starts from the time instant TI4 of receiving the DCI DCI2, and ends at the time instant TI5. Thus, at the time instant TI5, the communication device CD switches to the SSSG SSSG1, and perform the single-TPR operation with the TRP TRP2 (e.g., monitors the SSSG SSSG1 according to the TCI state TCI4).

Between the location points P2-P3 (e.g., between the time instants TI2 and TI5), the communication device CD performs the multi-TPR operation with the TRPs TRP1-TRP2, e.g., according to the TCI states TCI2-TCI3 and the SSSG SSSG2 (e.g., monitors the SSSG SSSG2 according to the TCI states TCI2-TCI3). Between the location points P3-P4 (e.g., after the time instant TI5), the communication device CD performs the single-TPR operation with the TRP TRP2, e.g., according to the TCI state TCI4 and the SSSG SSSG1 (e.g., monitors the SSSG SSSG1 according to the TCI state TCI4). In FIG. 16, the DCI comprises a field indicating a period for a SSSG switching, but does not comprise a TCI field indicating at least one TCI state and/or a SSSG switching field indicating a SSSG.

Figure 17:
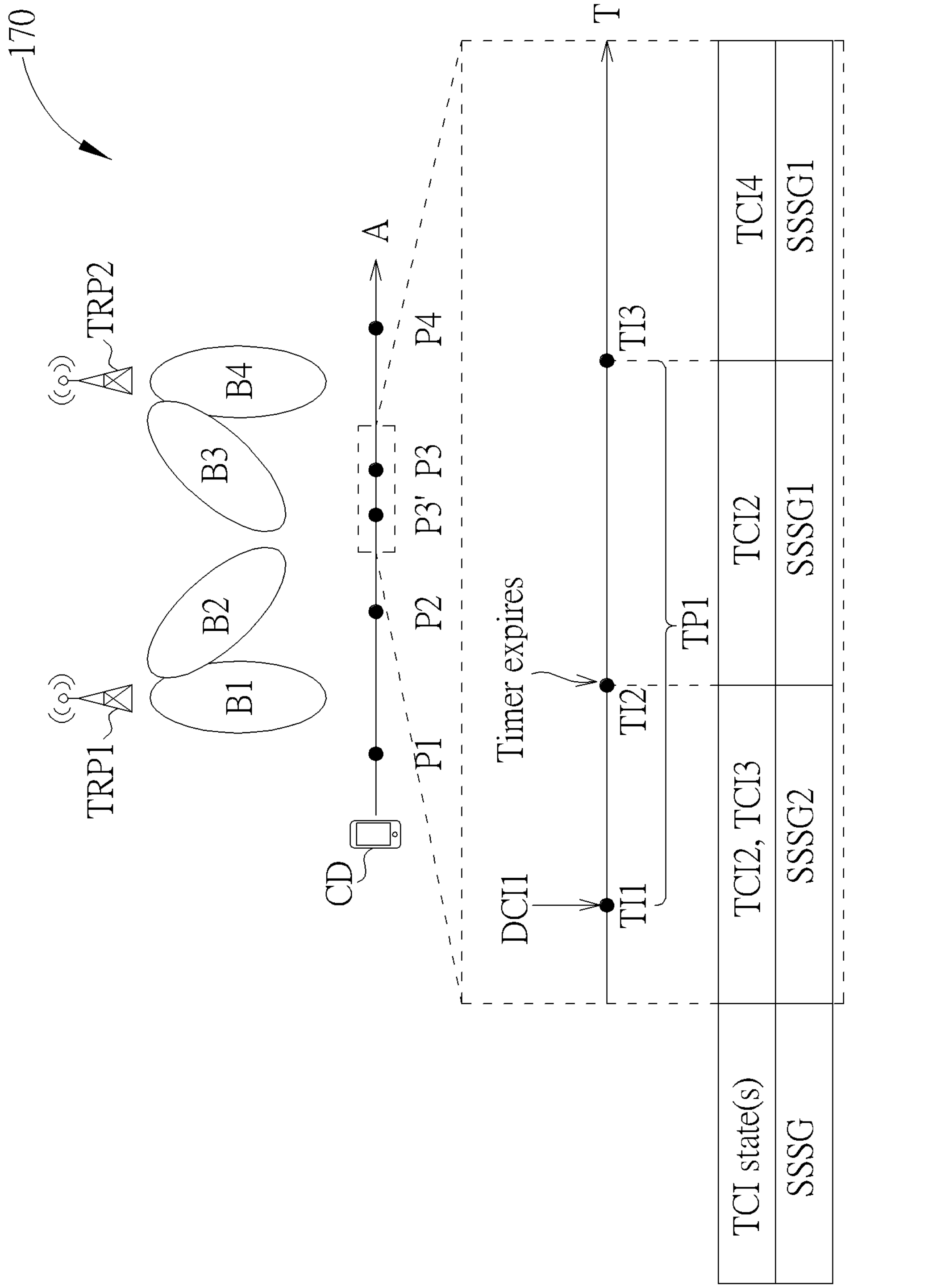
FIG. 17 is a schematic diagram of a scenario for handling SSSG and TCI state according to an example of the present invention.

FIG. 17 is a schematic diagram of a scenario 170 for handling SSSG and TCI state according to an example of the present invention. FIG. 17 may be applied to FIGS. 1-6. In FIG. 17, a communication device CD, a network (not shown) with two TRPs TRP1-TRP2, beams B1-B4, TCI states TCI1-TCI4, SSSGs SSSG1-SSSG2, a moving direction arrow A and location points P1-P4 can be referred to FIG. 7, and not narrated herein for brevity. In addition, there are time instants TI1-TI3 and a time period TP1 in a time dimension T and a location point P3' in the moving direction arrow A. The communication device is configured with a timer.

In FIG. 17, between the location points P2 and P3' (e.g., before the time instant TI2), the communication device CD performs the multi-TPR operation with the TRPs TRP1-TRP2 according to the TCI states TCI2-TCI3 and the SSSG SSSG2 (e.g., monitors the SSSG SSSG2 according to the TCI states TCI2-TCI3). At the time instant TI1, the communication device CD receives a DCI DCI1 from the TRP TRP1 and/or the TRP TRP2, and starts the timer. The DCI DCI1 comprises a time period field indicating the time period TP1. The time period TP1 starts from the time instant TI1 of receiving the DCI DCI1, and ends at the time instant TI3. At the time instant TI2, the timer expires and the communication device CD switches to the SSSG SSSG1 in response to the expiring timer. Between the location points P3' and P3 (e.g., between the time instants TI2-T13), the communication device CD performs the single-TPR operation with the TRP TRP1 or TRP2 according to one of the TCI states TCI2-TCI3 and a default SSSG (e.g., monitors the SSSG SSSG1 according to the TCI state TCI2). At the time instant TI3, the communication device CD does not change the SSSG SSSG1, and performs the single-TPR operation with the TRP TRP2 according to the TCI state TCI4 and the SSSG SSSG1 (e.g., monitors the SSSG SSSG1 according to the TCI state TCI4). Between the location points P3-P4 (e.g., after the time instant TI3), the communication device CD performs the single-TPR operation with the TRP TRP2 according to the TCI state TCI4 and the SSSG SSSG1 (e.g., monitors the SSSG SSSG1 according to the TCI state TCI4).

In FIG. 17, the time instant of performing the SSSG switching may be advanced from the time instant 113 to the time instant 112 in response to the expiring timer.

Figure 18:
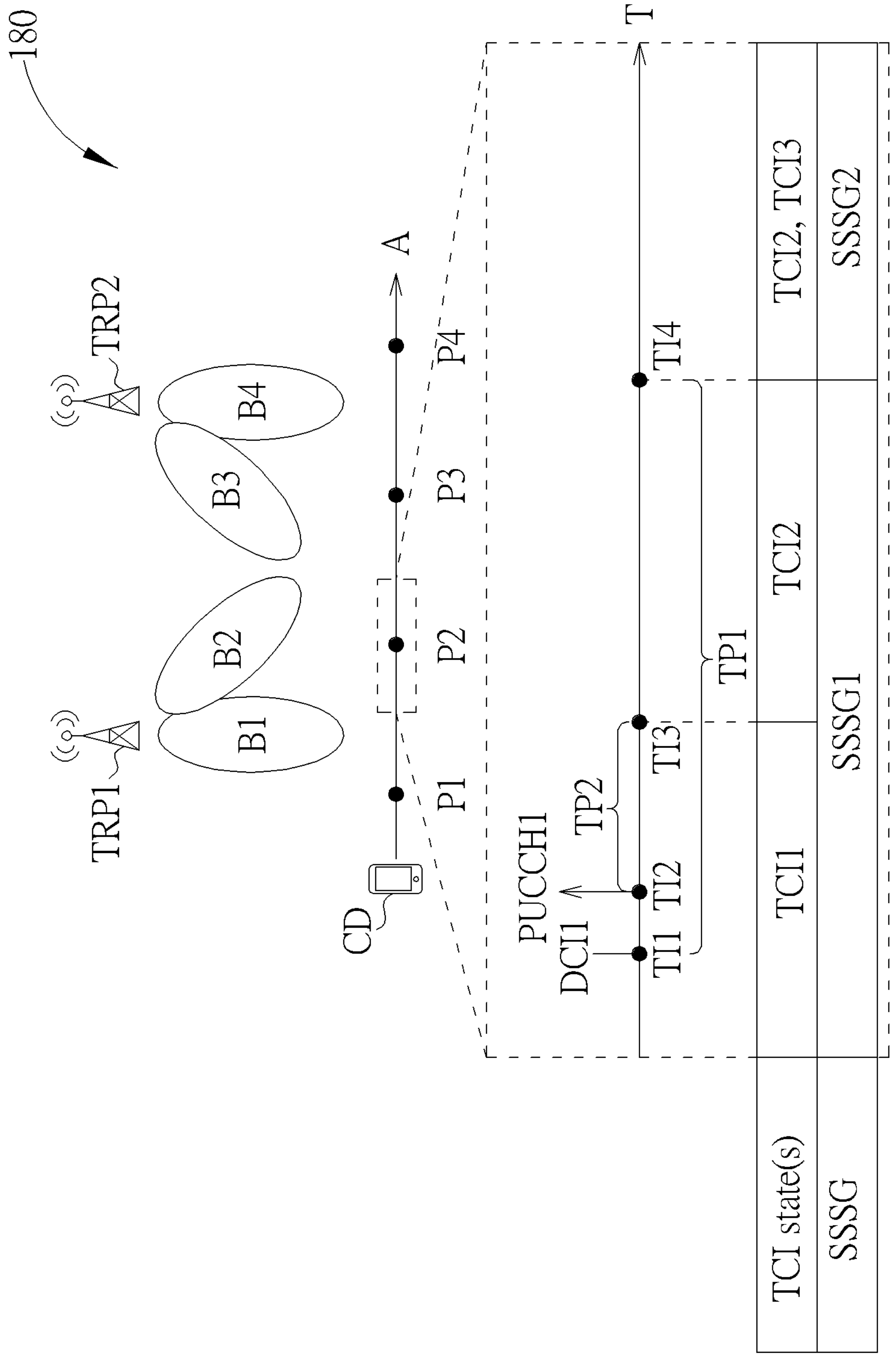
FIG. 18 is a schematic diagram of a scenario for handling SSSG and TCI state according to an example of the present invention.

FIG. 18 is a schematic diagram of a scenario 180 for handling SSSG and TCI state according to an example of the present invention. FIG. 18 may be applied to FIGS. 1-6. In FIG. 18, a communication device CD, a network (not shown) with two TRPs TRP1-TRP2, beams B1-B4, TCI states TCI1-TCI4, SSSGs SSSG1-SSSG2, a moving direction arrow A and location points P1-P4 can be referred to FIG. 7, and not narrated herein for brevity. In addition, there are time instants TI1-TI4 and time periods TP1-TP2 in a time dimension T.

In FIG. 18, between the location points P1-P2 (e.g., before the time instant TI3), the communication device CD may perform the single-TPR operation with the TRP TRP1 according to the TCI state TCI1 and the SSSG SSSG1 (e.g., may monitor the SSSG SSSG1 according to the TCI state TCI1). At the time instant TI1, the communication device CD receives a DCI DCI1 from the TRP TRP1. At the time instant TI2, the communication device CD transmits a PUCCH PUCCH1 with a HARQ feedback corresponding to the DCI DCI1 to the TRP TRP1. The DCI DCI1 comprises a TCI field (or a TCI indication) with a TCI codepoint indicating the TCI states TCI2-TCI3, and comprises a SSSG switching field indicating the time period TP1. The time period TP1 starts from the time instant TI1 of receiving the DCI DCI1, and ends at the time instant TI4. The time period TP2 between the time instants T12-TI3 is a time for beam application. After the time period TP2 from a last symbol of the PUCCH PUCCH1, the communication device CD applies one of the TCI states TCI2-TCI3 (e.g., the TCI state TCI2) indicated by the DCI DCI1.

Thus, between the location points P1-P2 (e.g., between the time instants TI3-TI4), the communication device CD may perform the single-TPR operation with the TRP TRP1 according to the TCI state TCI2 and the SSSG SSSG1 (e.g., may monitor the SSSG SSSG1 according to the TCI state TCI2). At the time instant TI4, the communication device CD switches to the SSSG SSSG2 according to the time instant TI1 and the time period TP1. Between the location points P2-P3 (e.g., after the time instant TI4), the communication device CD performs the multi-TPR operation with the TRPs TRP1-TRP2 according to the TCI states TCI2-TCI3 and the SSSG SSSG2 (e.g., monitors the SSSG SSSG2 according to the TCI states TCI2-TCI3).

Figure 19:
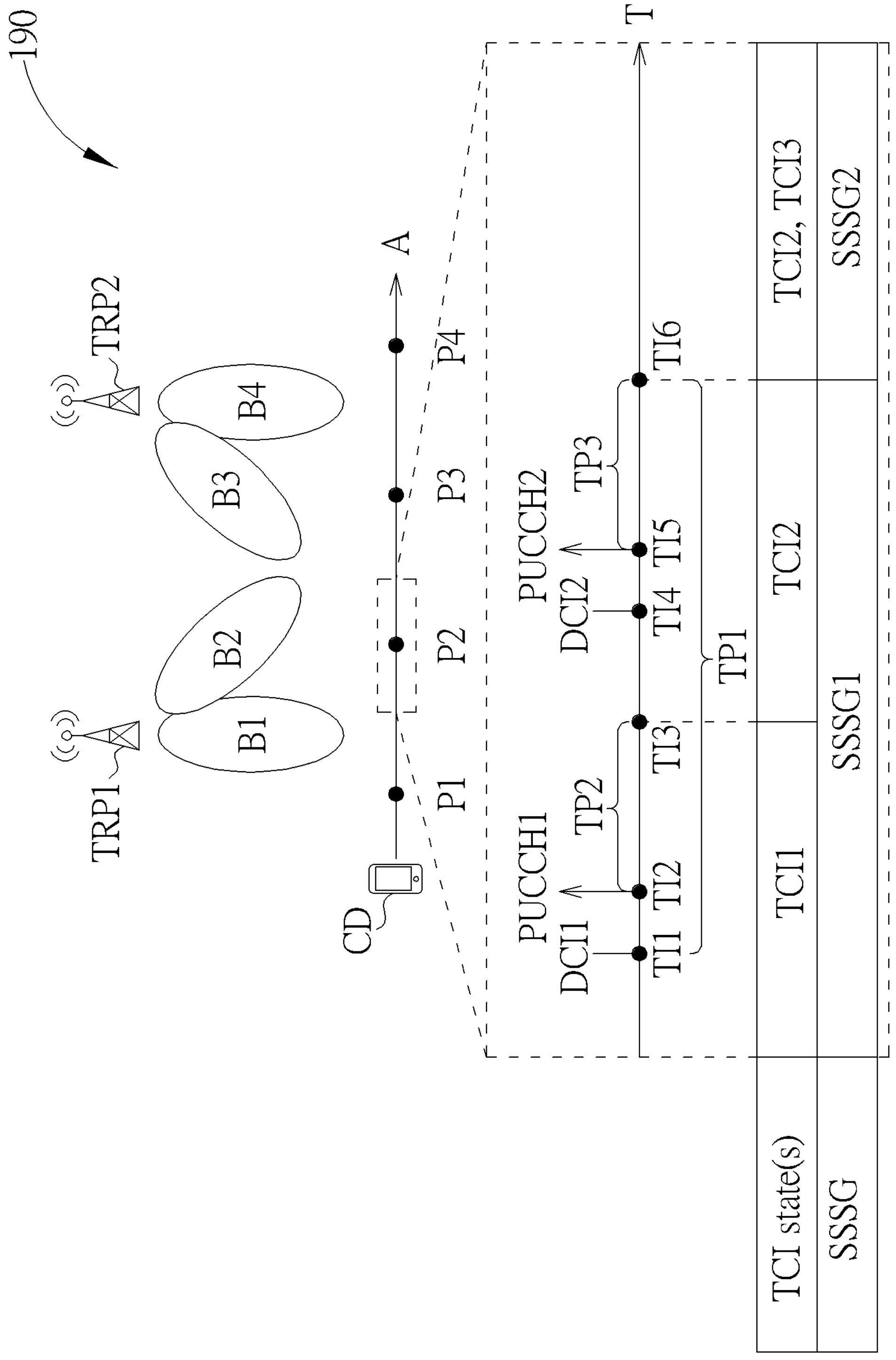
FIG. 19 is a schematic diagram of a scenario for handling SSSG and TCI state according to an example of the present invention.

FIG. 19 is a schematic diagram of a scenario 190 for handling SSSG and TCI state according to an example of the present invention. FIG. 19 may be applied to FIGS. 1-6. In FIG. 19, a communication device CD, a network (not shown) with two TRPs TRP1-TRP2, beams B1-B4, TCI states TCI1-TCI4, SSSGs SSSG1-SSSG2, a moving direction arrow A and location points P1-P4 can be referred to FIG. 7, and not narrated herein for brevity. In addition, there are time instants TI1-TI6 and time periods TP1-TP3 in a time dimension T.

In FIG. 19, between the location points P1-P2 (e.g., before the time instant TI3), the communication device CD may perform the single-TPR operation with the TRP TRP1 according to the TCI state TCI1 and the SSSG SSSG1 (e.g., may monitor the SSSG SSSG1 according to the TCI state TCI1). At the time instant TI1, the communication device CD receives a DCI DCI1 from the TRP TRP1. At the time instant TI2, the communication device CD transmits a PUCCH PUCCH1 with a HARQ feedback corresponding to the DCI DCI1 to the TRP TRP1. The DCI DCI1 comprises a TCI field (or a TCI indication) with a TCI codepoint indicating the TCI state TCI2, and comprises a SSSG switching field indicating the time period TP1. The time period TP1 starts from the time instant TI1 of receiving the DCI DCI1, and ends at the time instant TI6. The time period TP2 between the time instants T12-TI3 is a time for beam application. After the time period TP2 from a last symbol of the PUCCH PUCCH1, the communication device CD applies the TCI state TCI2 indicated by the DCI DCI1. Thus, between the location points P1-P2 (e.g., between the time instants TI3-T16), the communication device CD may perform the single-TPR operation with the TRP TRP1 according to the TCI state TCI2 and the SSSG SSSG1 (e.g., may monitor the SSSG SSSG1 according to the TCI state TCI2).

At the time instant TI4, the communication device CD receives a DCI DCI2 from the TRP TRP1. At the time instant TI5, the communication device CD transmits a PUCCH PUCCH2 with a HARQ feedback corresponding to the DCI DCI2 to the TRP TRP1. The DCI DCI2 comprises a TCI field (or a TCI indication) with a TCI codepoint indicating the TCI states TCI2-TCI3, and comprises a time period field indicating the time period TP3. The time period TP3 starts from the time instant TI4 of receiving the DCI DCI2, and ends at the time instant TI6. At the time instant TI6, the communication device CD switches to the SSSG SSSG2 according to the time instant TI4 and the time period TP3. Between the location points P2-P3 (e.g., after the time instant TI6), the communication device CD performs the multi-TPR operation with the TRPs TRP1-TRP2 according to the TCI states TCI2-TCI3 and the SSSG SSSG2 (e.g., may monitor the SSSG SSSG2 according to the TCI states TCI2-TCI3).

FIG. 20 is a schematic diagram of TCI codepoints of a TCI field in a DCI according to an example of the present invention. FIG. 20 may be applied to FIGS. 1-6. A table 204 is determined by a MAC CE, and comprises $C_i$, R, $D_i$ and TCI states (e.g., TCI state $ID_{i,j}$), wherein i and j are positive integers. i is an index of a TCI codepoint of the TCI field in the DCI, and j is an index of a TCI state. TCI state $ID_{i,j}$ denotes the jth TCI state indicated for the ith TCI codepoint. In the table 204, $C_i$ indicates that a TCI codepoint in a TCI field indicates one TCI state or multiple TCI states (e.g., whether a TCI state $ID_{i,2}$ is present). $C_i$ with "0" (e.g., $C_0$ and $C_1$) denotes that TCI codepoint in a TCI field indicates one TCI state (e.g., the TCI state $ID_{i,2}$ is not present), and $C_i$ with "1" (e.g., $C_2$ and $C_3$) denotes that the TCI codepoint indicates multiple TCI states (e.g., the TCI state $ID_{i,2}$ is present). $D_i$ indicates a default TCI state for monitoring a default SSSG. $D_i$ with "0" (e.g., $D_2$) denotes that the TCI state $ID_{i,1}$ is the default TCI state, and $D_i$ with "1" (e.g., $D_3$) denotes that the TCI state $ID_{i,2}$ is the default TCI state. If $C_i$ is set to be "0", R is present instead of $D_i$. R is a reserved bit, and is set to "0".

In FIG. 20, a table 202 is determined by a network according to the table 204, and comprises TCI codepoints of the TCI field in the DCI. Each of the TCI codepoint indicates at least one TCI state (e.g., TCI state $ID_{i,j}$). The codepoint with "0" indicates TCI state $ID_{0,1}$, which is determined according to $C_0$, R and TCI state $ID_{0,1}$ in the table 204. The codepoint with "1" indicates TCI state $ID_{1,1}$, which is determined according $C_1$, R and TCI state $ID_{1,1}$ in the table 204. The codepoint with "2" indicates TCI state $ID_{2,1}$ and TCI state $ID_{2,2}$ and TCI state $ID_{2,1}$ is the default TCI state, which is determined according $C_2$, $D_2$, TCI state $ID_{2,1}$ and TCI state $ID_{2,2}$ in the table 204. The codepoint with "3" indicates TCI state $ID_{3,1}$ and TCI state $ID_{3,2}$ and TCI state $ID_{3,2}$ is the default TCI state, which is determined according $C_3$, $D_3$, TCI state $ID_{3,1}$ and TCI state $ID_{3,2}$ in the table 204.

FIG. 21 is a schematic diagram of TCI codepoints of a TCI field in a DCI according to an example of the present invention. FIG. 21 may be applied to FIGS. 1-6. A table 212 is determined by a network, and comprises TCI codepoints of the TCI field in the DCI. Each of the TCI codepoint indicates at least one TCI state (e.g., TCI state $ID_{i,j}$). i and j are positive integers. i is an index of a TCI codepoint, and j is an index of a TCI state. TCI state $ID_{i,j}$ denotes the jth TCI state indicated for the ith TCI codepoint. The codepoint with "0" indicates TCI state $ID_{0,1}$. The codepoint with "1" indicates TCI state $ID_{1,1}$. The codepoint with "2" indicates TCI state $ID_{2,1}$ and TCI state $ID_{2,2}$ and TCI state $ID_{2,1}$. The codepoint with "3" indicates TCI state $ID_{3,1}$ and TCI state $ID_{3,2}$. In table 212, TCI state $ID_{i,2}$ is determined as a default TCI state, if TCI state $ID_{i,2}$ is present. Thus, TCI state $ID_{2,2}$ and TCI state $ID_{3,2}$ are default TCI states.

Figure 22:
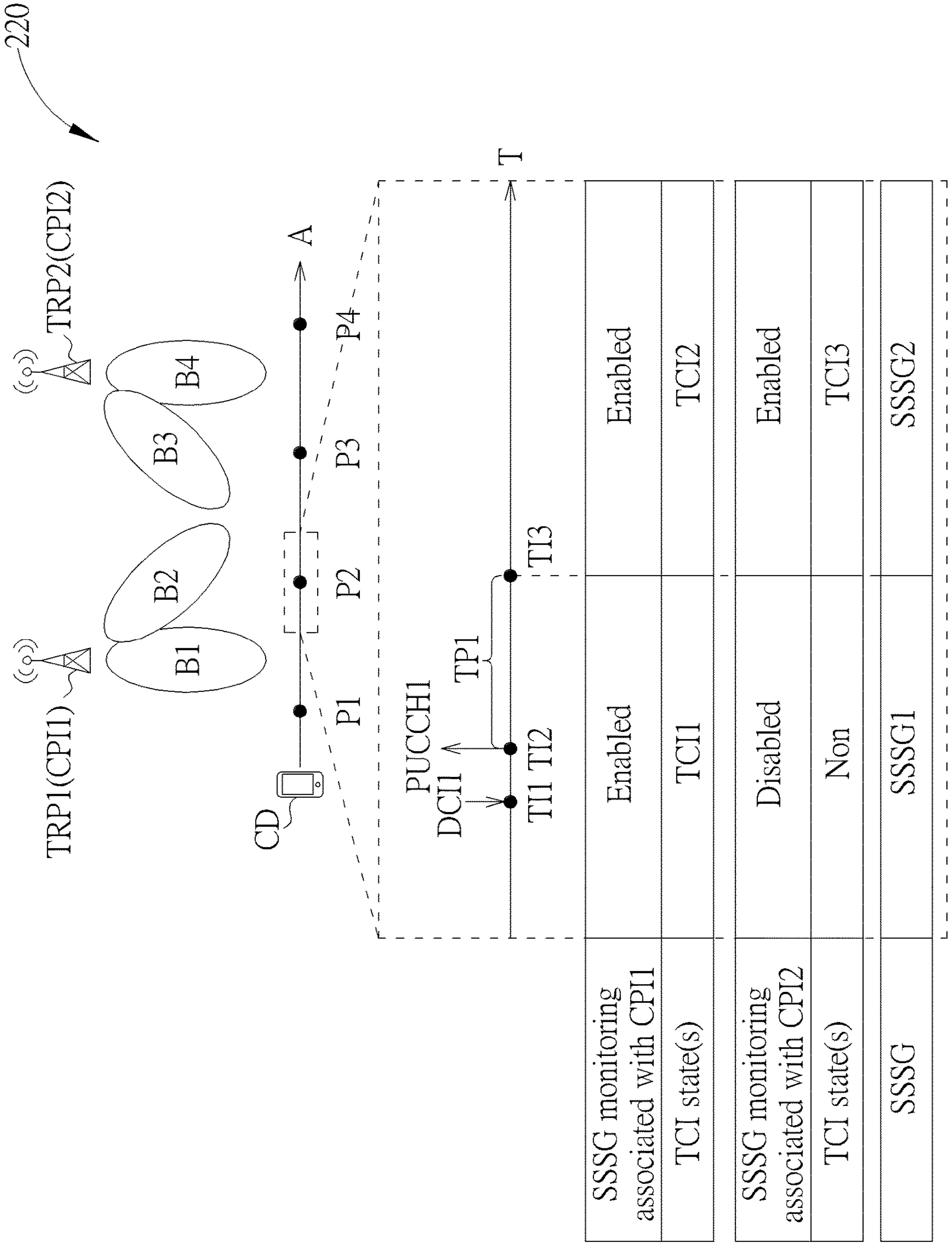
FIG. 22 is a schematic diagram of a scenario for handling SSSG and TCI state according to an example of the present invention.

FIG. 22 is a schematic diagram of a scenario 220 for handling SSSG and TCI state according to an example of the present invention. FIG. 22 may be applied to FIGS. 1-6. In FIG. 22, a communication device CD, a network (not shown) with two TRPs TRP1-TRP2, beams B1-B4, TCI states TCI1-TCI4, SSSGs SSSG1-SSSG2, a moving direction arrow A and location points P1-P4 can be referred to FIG. 7, and not narrated herein for brevity. In addition, there are time instants TI1-TI3 and a time period TP1 in a time dimension T. The TRP TRP1 is associated with a COREST pool index CPI1, and the TRP TRP2 is associated with a COREST pool index CPI2.

In FIG. 22, between the location points P1-P2 (e.g., before the time instant TI3), the communication device CD performs the single-TPR operation with the TRP TRP1 according to the TCI state TCI1 and the SSSG SSSG1 (e.g., monitors the SSSG SSSG1 according to the TCI state TCI1). That is, a SSSG monitoring for the SSSG SSSG1 associated with the COREST pool index CPI1 is enabled, and a SSSG monitoring for the SSSG SSSG1 associated with the COREST pool index CPI2 is disabled. At the time instant TI1, the communication device CD receives a DCI DCI1 from the TRP TRP1. At the time instant TI2, the communication device CD transmits a PUCCH PUCCH1 with a HARQ feedback corresponding to the DCI DCI1 to the TRP TRP1. The DCI DCI1 comprises a TCI field (or a TCI indication) with a TCI codepoint indicating the TCI states TCI2-TCI3, and comprises a SSSG monitoring field indicating that the SSSG monitoring associated with the COREST pool index CPI2 is enabled. At the time instant TI3, the communication device CD switches to the SSSG SSSG2 in response to the TCI field indicating at least two of the TCI states TCI1-TCI4.

Thus, between the location points P2-P3 (e.g., after the time instant TI3), the communication device CD performs the multi-TPR operation with the TRPs TRP1-TRP2 according to the TCI states TCI2-TCI3 and the SSSG SSSG2 (e.g., monitors the SSSG SSSG2 according to the TCI states TCI2-TCI3). In addition, the time period TP1 between the time instants T12-TI3 is a time for beam application. After the time period TP1 and/or enabling a SSSG monitoring from a last symbol of the PUCCH PUCCH1, the communication device CD applies the TCI states TCI2-TCI3 indicated by the DCI DCI1 and/or performs the SSSG monitoring associated with the COREST pool indexes CPI1-CPI2.

Figure 23:
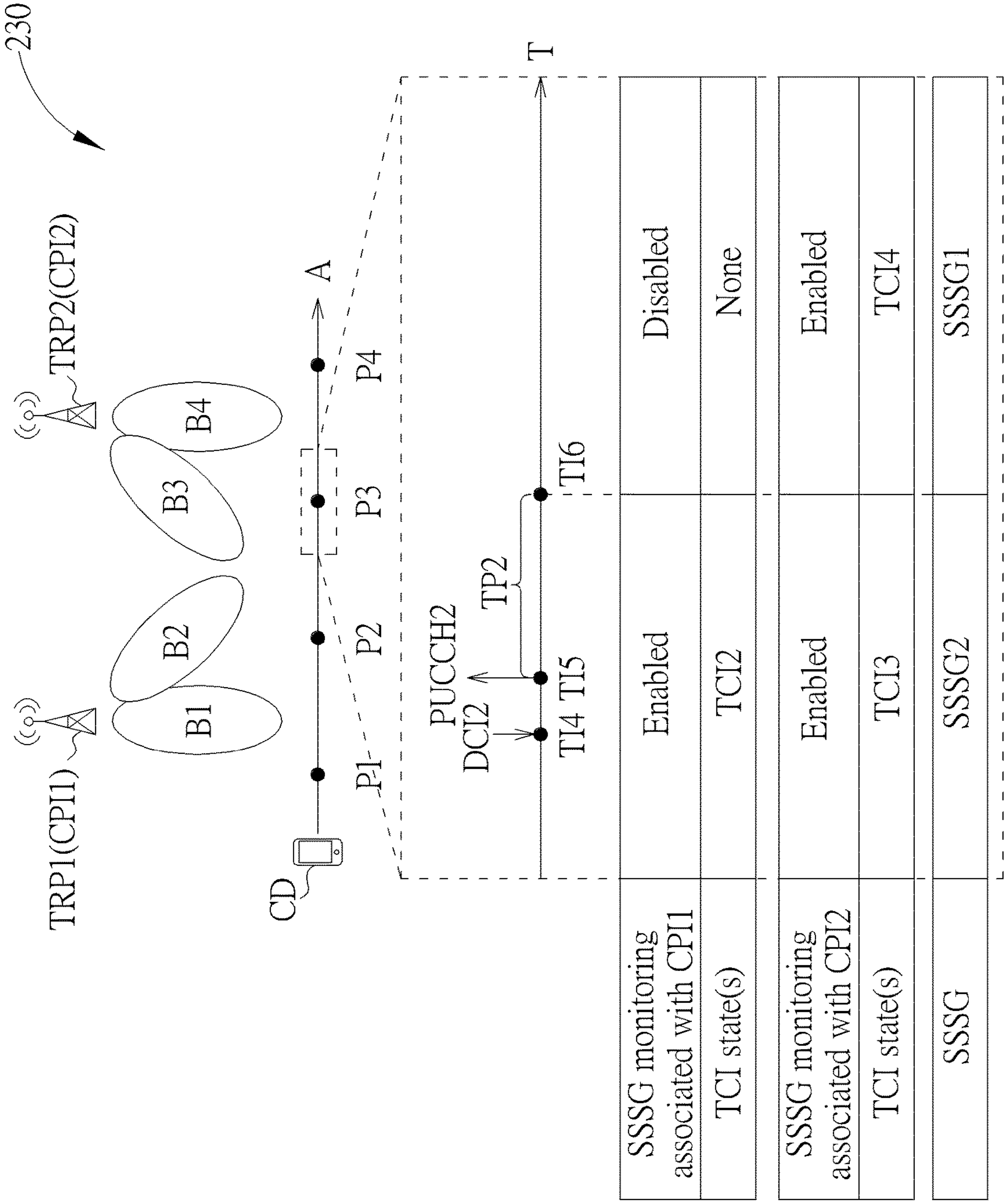
FIG. 23 is a schematic diagram of a scenario for handling SSSG and TCI state according to an example of the present invention.

FIG. 23 is a schematic diagram of a scenario 230 for handling SSSG and TCI state according to an example of the present invention. FIG. 23 may be applied to FIGS. 1-6 and 21. In FIG. 23, a communication device CD, a network (not shown) with two TRPs TRP1-TRP2, beams B1-B4, TCI states TCI1-TCI4, SSSGs SSSG1-SSSG2, a moving direction arrow A and location points P1-P4, COREST pool indexes CPI1-CPI2 can be referred to FIG. 22, and not narrated herein for brevity. In addition, there are time instants T14-TI6 and a time period TP2 in a time dimension T.

In FIG. 23, between the location points P2-P3 (e.g., before the time instant TI6), the communication device CD performs the multi-TPR operation with the TRPs TRP1-TRP2 according to the TCI states TCI2-TCI3 and the SSSG SSSG2 (e.g., monitors the SSSG SSSG2 according to the TCI states TCI2-TCI3). That is, a SSSG monitoring for the SSSG SSSG2 associated with the COREST pool indexes CPI1-CPI2 is enabled. At the time instant TI4, the communication device CD receives a DCI DCI2 from the TRP TRP1 and/or the TRP TRP2. At the time instant TI5, the communication device CD transmits a PUCCH PUCCH2 with a HARQ feedback corresponding to the DCI DCI2 to the TRP TRP1 and/or the TRP TRP2. The DCI DCI2 comprises a TCI field (or a TCI indication) with a TCI codepoint indicating the TCI state TCI4, and comprises a SSSG monitoring field indicating that the SSSG monitoring associated with the COREST pool index CPI1 is disabled. At the time instant TI6, the communication device CD switches to the SSSG SSSG1 in response to the TCI field indicating one of the TCI states TCI1-TCI4.

Thus, between the location points P3-P4 (e.g., after the time instant TI6), the communication device CD performs the single-TPR operation with the TRP TRP2 according to the TCI state TCI4 and the SSSG SSSG1 (e.g., monitors the SSSG SSSG1 according to the TCI state TCI4). In addition, the time period TP2 between the time instants T15-TI6 is a time for beam application. After the time period TP2 and/or disabling a SSSG monitoring from a last symbol of the PUCCH PUCCH2, the communication device CD does not perform the SSSG monitoring associated with the COREST pool index CPI1.

Figure 24:
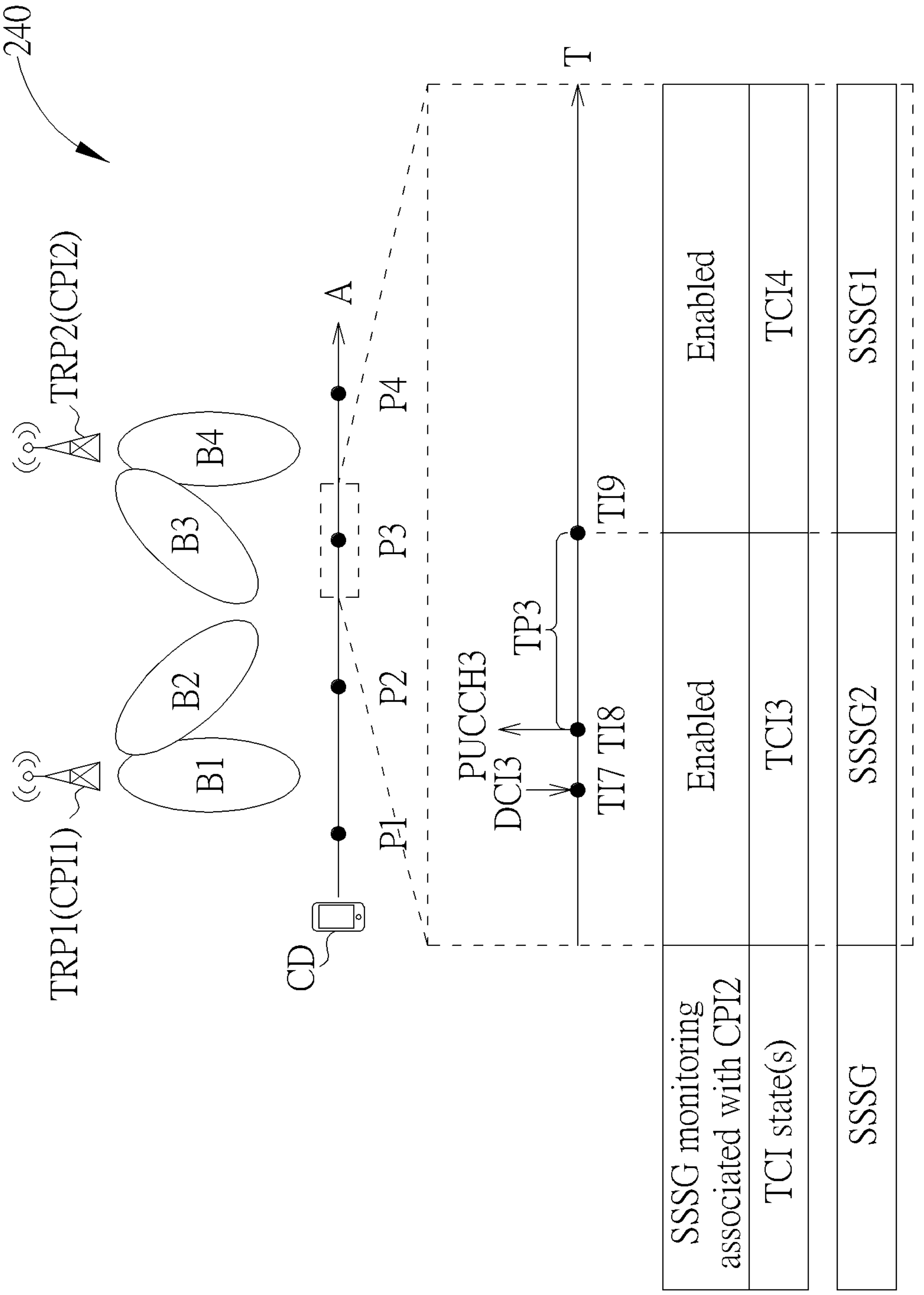
FIG. 24 is a schematic diagram of a scenario for handling SSSG and TCI state according to an example of the present invention.

FIG. 24 is a schematic diagram of a scenario 240 for handling SSSG and TCI state according to an example of the present invention. FIG. 24 may be applied to FIGS. 1-6 and 22-23. In FIG. 24, a communication device CD, a network (not shown) with two TRPs TRP1-TRP2, beams B1-B4, TCI states TCI1-TCI4, SSSGs SSSG1-SSSG2, a moving direction arrow A and location points P1-P4, COREST pool indexes CPI1-CPI2 can be referred to FIG. 22, and not narrated herein for brevity. In addition, there are time instants T17-TI9 and a time period TP3 in a time dimension T.

In FIG. 24, between the location points P2-P3 (e.g., before the time instant TI9), the communication device CD performs the multi-TPR operation with the TRPs TRP1-TRP2 according to the TCI state TCI2 (not shown) and the TCI state TCI3 and the SSSG SSSG2 (e.g., monitors the SSSG SSSG2 according to the TCI states TCI2-TCI3). That is, a SSSG monitoring for the SSSG SSSG2 associated with the COREST pool indexes CPI1-CPI2 is enabled. At the time instant TI7, the communication device CD receives a DCI DCI3 from the TRP TRP2. The DCI DCI3 comprises a TCI field (or a TCI indication) with a TCI codepoint indicating the TCI state TCI4. The DCI DCI3 comprises information for the TRP TRP2, but does not comprise information for the TRP TRP1. At the time instant TI8, the communication device CD transmits a PUCCH PUCCH3 with a HARQ feedback corresponding to the DCI DCI3. At the time instant TI9, the communication device CD switches to the SSSG SSSG1 in response to the TCI field indicating one of the TCI states TCI1-TCI4.

Thus, between the location points P3-P4 (e.g., after the time instant TI9), the communication device CD performs the single-TPR operation with the TRP TRP2 according to the TCI state TCI4 and the SSSG SSSG1 (e.g., monitors the SSSG SSSG1 according to the TCI state TCI4). In addition, the time period TP3 between the time instants T18-TI9 is a time for beam application. After the time period TP3 from a last symbol of the PUCCH PUCCH2, the communication device CD applies the TCI state TCI4 for the SSSG monitoring associated with the COREST pool index CPI2.

The operation of "determine" described above may be replaced by the operation of "compute", "calculate", "obtain", "generate", "output, "use", "choose/select", "decide" or "is configured to". The operation of "detect" described above may be replaced by the operation of "monitor", "receive", "sense" or "obtain". The phrase of "according to" described above may be replaced by "in response to". The phrase of "associated with" described above may be replaced by "of" or "corresponding to". The term of "via" described above may be replaced by "on", "in" or "at". The term of "when" described above may be replaced by "upon", "after" and "in response to". The term of "cell" described above may be replaced by "serving cell".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module (s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, embodiments of the present invention provide a communication device and method for handling SSSG and TCI state. The communication device receives a DCI from a network, wherein the DCI comprises at least one field indicating a TCI state(s), a SSSG and/or a time period. The DCI is used for handling the SSSG switching/monitoring and the TCI state, and realizes the dynamic switching between the single-TRP and the multi-TRP. Thus, the problem of how to handling the SSSG and the TCI state can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for monitoring and switching search space set group (SSSG), comprising:
- at least one storage device; and
- at least one processing circuit, coupled to the at least one storage device, wherein the at least one storage device stores instructions, and the at least one processing circuit is configured to execute the instructions of:
- receiving a configuration of a first SSSG and a second SSSG from a network, wherein the first SSSG is associated with a transmission configuration indicator (TCI) state and the second SSSG is associated with a plurality of TCI states;
- monitoring one of the first SSSG and the second SSSG according to the configuration;
- receiving a first downlink (DL) control information (DCI) for a SSSG switching from the network, when monitoring the one of the first SSSG or the second SSSG according to the configuration; and
- performing the SSSG switching according to the first DCI;
- wherein the first DCI comprises a first field, and the instruction of performing the SSSG switching according to the first DCI comprises:
- switching to the first SSSG and monitoring the first SSSG according to the TCI state, when the first field indicates the TCI state; and
- switching to the second SSSG and monitoring the second SSSG according to the plurality of TCI states, when the first field indicates the plurality of TCI states.

2. The communication device of claim 1, wherein the first DCI further comprises a second field; the communication device switches to the first SSSG and monitoring the first SSSG according to the TCI state, when the first field indicates the TCI state and the second field indicates the first SSSG; and the communication device switches to the second SSSG and monitoring the second SSSG according to the plurality of TCI states, when the first field indicates the plurality of TCI states and the second field indicates the second SSSG.

3. The communication device of claim 1, the first DCI further comprises a second field indicating a time period; the communication device switches to the first SSSG at an end of the time period and monitoring the first SSSG according to the TCI state, when the first field indicates the TCI state; and the communication device switches to the second SSSG at the end of the time period and monitoring the second SSSG according to the plurality of TCI states, when the first field indicates the plurality of TCI states.

4. The communication device of claim 3, wherein the time period is between a first time instant of receiving the first DCI from the network and a second time instant of performing the SSSG switching.

5. The communication device of claim 3, wherein the time period is between a first time instant of transmitting a Hybrid Automatic Repeat Request (HARQ) feedback corresponding to the first DCI and a second time instant of performing the SSSG switching.

6. The communication device of claim 1, the first DCI further comprises a second field indicating a time period; the communication device monitors the first SSSG according to one of the plurality of TCI states, when the first field indicates the plurality of TCI states; and the communication device switches to the second SSSG at an end of the time period and monitoring the second SSSG according to the plurality of TCI states.

7. The communication device of claim 6, wherein the one of the plurality of TCI states is predetermined or indicated by a media access control (MAC) control element (CE).

8. The communication device of claim 1, the first DCI further comprises a second field indicating a first time period; the communication device monitors the first SSSG according to one of the plurality of TCI states, when the first field indicates the one of the plurality of TCI states; the communication device receives a second DCI, wherein the second DCI comprises a third field indicating the plurality of TCI states and a fourth field indicating a second time period; and the communication device switches to the second SSSG at the end of the second time period and monitoring the second SSSG according to the plurality of TCI states.

9. The communication device of claim 8, wherein an end of the first time period and the end of the second time period are at a same time instant.

10. The communication device of claim 1, wherein the first DCI further comprises a second field; the communication device switches to the first SSSG and monitoring the first SSSG according to the TCI state, when the first field indicates the TCI state and the second field indicates that a first SSSG monitoring associated with a first value of a CORESET pool index is disabled; and the communication device switches to the second SSSG and monitoring the second SSSG according to the plurality of TCI states, when the first field indicates the plurality of TCI states and the second field indicates that a second SSSG monitoring associated with a second value of the CORESET pool index is enabled.

11. The communication device of claim 10, wherein the first DCI is associated with one of the first CORESET pool index and the second CORESET pool index.

12. The communication device of claim 11, wherein the communication device receives the first DCI from the network indicated by the one of the first CORESET pool index and the second CORESET pool index.

13. The communication device of claim 1, wherein the first DCI is associated with a CORESET pool index.

14. The communication device of claim 1, wherein the communication device receives the DCI from the network indicated by the CORESET pool index.

15. A network for monitoring and switching search space set group (SSSG), comprising:

at least one storage device; and at least one processing circuit, coupled to the at least one storage device, wherein the at least one storage device stores instructions, and the at least one processing circuit is configured to execute the instructions of:

generating a configuration of a first SSSG and a second SSSG, wherein the first SSSG is associated with a transmission configuration indicator (TCI) state and the second SSSG is associated with a plurality of TCI states;

transmitting the configuration to a communication device;

generating a first downlink (DL) control information (DCI) for a SSSG switching; and transmitting the first DCI to the communication device;

wherein the first DCI comprises a first field indicating the TCI state or the plurality of TCI states;

wherein the first SSSG is switched to and monitored according to the TCI state, when the field indicates the TCI state; and wherein the second SSSG is switched to and monitored according to the plurality of TCI states, when the field indicates the plurality of TCI states.

16. The network of claim 15, wherein the first DCI further comprises a second field indicating a time period.

17. The network of claim 16, wherein the time period is between a first time instant for the communication device to receive the first DCI from the network and a second time instant for the communication device to perform the SSSG switching.

18. The network of claim 16, wherein the time period is between a first time instant for the communication device to transmit a Hybrid Automatic Repeat Request (HARQ) feedback corresponding to the first DCI and a second time instant for the communication device to perform the SSSG switching.

19. The network of claim 15, wherein the first DCI further comprises a second field indicating that a first SSSG monitoring associated with a first CORESET pool index is disabled or indicating that a second SSSG monitoring associated with a second CORESET pool index is enabled.

20. The network of claim 19, wherein the first DCI is associated with one of the first CORESET pool index and the second CORESET pool index.

21. The network of claim 20, wherein the first DCI is transmitted to the communication device from the network indicated by the one of the first CORESET pool index and the second CORESET pool index.

22. The network of claim 15, wherein the instructions further comprises:

generating a second DCI for the SSSG switching; and transmitting the second DCI to the communication device.

23. The network of claim 22, wherein the first DCI comprises the first field indicating one of the plurality of TCI states and a second field indicating a first time period, and the second DCI comprises a third field indicating the plurality of TCI states and a fourth field indicating a second time period.

24. The network of claim 23, wherein an end of the first time period and the end of the second time period are at a same time instant.

25. A communication device for indicating and applying transmission configuration indicator (TCI) state, comprising:

at least one storage device; and at least one processing circuit, coupled to the at least one storage device, wherein the at least one storage device stores instructions, and the at least one processing circuit is configured to execute the instructions of:

receiving a downlink (DL) control information (DCI) from a network via a control resource set (CORESET), wherein the DCI comprises a TCI field, and the TCI field indicates a TCI codepoint corresponding to at least one of a first TCI state or a second TCI state, and the TCI codepoint is associated with a value of a CORESET pool index;

transmitting a physical uplink (UL) control channel (PUCCH) corresponding to the DCI comprising a TCI state indication to the network, wherein a last symbol of the PUCCH comprises hybrid automatic repeat request (HARQ) feedback; and starting applying the at least one of the first TCI state or the second TCI state indicated by the TCI field from a slot that is at least time for beam application symbols after the last symbol of the PUCCH, if the at least one of the first TCI state or the second TCI state is different from a previous TCI state indicated by a previous TCI state indication.

26. The communication device of claim 25, wherein the first TCI state TCI is a DL TCI state or an UL TCI state, and the second TCI state is the DL TCI state or the UL TCI state.

27. The communication device of claim 25, wherein the CORESET is configured with at least one TCI state indicated by the DCI, and the at least one TCI state comprise the at least one of the first TCI state or the second TCI state.

28. The communication device of claim 27, wherein the instruction further comprises:

receiving at least one physical DL control channel (PDCCH) from the network according to the at least one TCI state via the CORESET.

29. The communication device of claim 28, wherein a demodulation reference signal (DM-RS) antenna port for receiving the at least one PDCCH via the CORESET is quasi co-located (QCLed) with a plurality of RSs provided by the at least one TCI State.

30. The communication device of claim 25, wherein the CORESET is associated with at least one of a plurality of user equipment (UE) specific search space (USS) sets or a plurality of PDCCH common search space (CSS) sets.

31. The communication device of claim 25, wherein the CORESET is configured with the value of the CORESET pool index, and the value of the CORESET pool index is associated with the at least one of a first TCI state or a second TCI state.

32. The communication device of claim 25, wherein the TCI field indicates the at least one of the first TCI state or the second TCI state in a component carrier (CC) set or a bandwidth part (BWP) set in a CC list.

33. The communication device of claim 25, wherein the instruction further comprises:

receiving an activation command for mapping a plurality of TCI states to at least one TCI codepoint of the TCI field, from the network.

34. The communication device of claim 25, wherein the instruction further comprises:

transmitting a PUCCH to the network according to a spatial setting associated with at least one TCI state;

wherein the at least one TCI state comprises the at least one of the first TCI state) or the second TCI state.

35. The communication device of claim 25, wherein the first TCI state and the second TCI are associated with a same value of the CORESET pool index, if the TCI codepoint is corresponding to the first TCI state and the second TCI.

36. A network for indicating and applying transmission configuration indicator (TCI) state, comprising:

at least one storage device; and at least one processing circuit, coupled to the at least one storage device, wherein the at least one storage device stores instructions, and the at least one processing circuit is configured to execute the instructions of:

generating a downlink (DL) control information (DCI);

transmitting the DCI to a communication device via a control resource set (CORESET), wherein the DCI comprises a TCI field, and the TCI field indicates a TCI codepoint corresponding to at least one of a first TCI state or a second TCI state, and the TCI codepoint is associated with a value of a CORESET pool index; and receiving a physical uplink (UL) control channel (PUCCH) corresponding to the DCI comprising a TCI state indication from the communication device, wherein a last symbol of the PUCCH comprises hybrid automatic repeat request (HARQ) feedback;

wherein the at least one of the first TCI state or the second TCI state indicated by the TCI state indication starts to be applied from a slot that is at least time for beam application symbols after the last symbol of the PUCCH, if the at least one of the first TCI state or the second TCI state is different from a previous TCI state indicated by a previous TCI state indication.

37. The network of claim 36, wherein the first TCI state TCI is a DL TCI state or an UL TCI state, and the second TCI state is the DL TCI state or the UL TCI state.

38. The network of claim 36, wherein the CORESET is configured with at least one TCI state indicated by the DCI, and the at least one TCI state comprise the at least one of the first TCI state or the second TCI state.

39. The network of claim 38, wherein the instruction further comprises:

transmitting at least one physical DL control channel (PDCCH) to the communication device according to the at least one TCI state via the CORESET.

40. The network of claim 39, wherein a demodulation reference signal (DM-RS) antenna port for receiving the at least one PDCCH via the CORESET is quasi co-located (QCLed) with a plurality of RSs provided by the at least one TCI State.

41. The network of claim 36, wherein the CORESET is associated with at least one of a plurality of user equipment (UE) specific search space (USS) sets or a plurality of PDCCH common search space (CSS) sets.

42. The network of claim 36, wherein the CORESET is configured with the value of the CORESET pool index, and the value of the CORESET pool index is associated with the at least one of a first TCI state or a second TCI state.

43. The network of claim 36, wherein the TCI field indicates the at least one of the first TCI state or the second TCI state in a component carrier (CC) set or a bandwidth part (BWP) set in a CC list.

44. The network of claim 36, wherein the instruction further comprises:

transmitting an activation command for mapping a plurality of TCI states to at least one TCI codepoint of the TCI field, to the communication device.

45. The network of claim 36, wherein the instruction further comprises:

receiving a PUCCH from the communication device according to a spatial setting associated with at least one TCI state;

wherein the at least one TCI state comprises the at least one of the first TCI state or the second TCI state.

46. The network of claim 36, wherein the first TCI state and the second TCI are associated with a same value of the CORESET pool index, if the TCI codepoint is corresponding to the first TCI state and the second TCI.

* * * * *